United States Patent [19]
Tanabe et al.

[11] Patent Number: 5,999,537
[45] Date of Patent: Dec. 7, 1999

[54] PACKET SWITCHING SYSTEM HAVING SELF-ROUTING SWITCHES

[75] Inventors: Shirou Tanabe, Hachioji; Taihei Suzuki, Kodaira; Shinobu Gohara; Yoshito Sakurai, both of Yokohama; Kenichi Ohtsuki, Kanagawa-ken; Takao Kato, Yokohama; Hiroshi Kuwahara, Kodaira; Eiichi Amada, Tokyo, all of Japan

[73] Assignee: Hitachi, Ltd., Tokyo, Japan

[21] Appl. No.: 08/838,950

[22] Filed: Apr. 23, 1997

Related U.S. Application Data

[63] Continuation of application No. 08/438,959, May 11, 1995, which is a continuation of application No. 07/645,491, Jan. 24, 1991, which is a continuation-in-part of application No. 07/096,011, Sep. 14, 1987, Pat. No. 5,043,979.

[30] Foreign Application Priority Data

| Sep. 16, 1986 | [JP] | Japan | 61-215767 |
| Sep. 16, 1986 | [JP] | Japan | 61-215768 |
| Feb. 25, 1987 | [JP] | Japan | 62-40205 |
| Jan. 24, 1990 | [JP] | Japan | 2-12540 |

[51] Int. Cl.[6] .......................... H04L 12/28; H04L 12/56
[52] U.S. Cl. .......................................... 370/409; 370/389
[58] Field of Search .......................... 370/351, 352–357, 370/395, 396, 397, 389, 392, 409, 230, 468, 399

[56] References Cited

U.S. PATENT DOCUMENTS

| Re. 31,182 | 3/1983 | Crager et al. | 370/60 |
| 3,890,469 | 6/1975 | Kelly et al. | 370/60 |
| 3,979,733 | 9/1976 | Fraser | 340/172.5 |
| 4,009,347 | 2/1977 | Flemming et al. | 370/95.3 |
| 4,058,672 | 11/1977 | Crager et al. | 370/60 |
| 4,058,838 | 11/1977 | Crager et al. | 370/60 |
| 4,152,548 | 5/1979 | Horiki | 370/110.1 |

(List continued on next page.)

FOREIGN PATENT DOCUMENTS

| 0168927 | 1/1986 | European Pat. Off. . |
| 0230676 | 8/1987 | European Pat. Off. . |
| 0259117 | 3/1988 | European Pat. Off. . |
| 0274793 | 7/1988 | European Pat. Off. . |
| 0289733 | 11/1988 | European Pat. Off. . |
| 0343611A2 | 11/1989 | European Pat. Off. . |
| 0343611A3 | 11/1989 | European Pat. Off. . |

(List continued on next page.)

OTHER PUBLICATIONS

1986 International Zurich Seminar on Digital Communications, New Directions in Switching and Networks, "An Experimental Synchronous Composite Packet Switching System", by T. Takejchi, et al., Mar. 11–13, 1986, Zurich/Switzerland, Swiss Federal Institute of Technology, Proceedings.

(List continued on next page.)

*Primary Examiner*—Ajit Patel
*Attorney, Agent, or Firm*—Antonelli, Terry, Stout & Kraus, LLP

[57] ABSTRACT

A packet switching system which includes a device for setting, between a tandem unit and a destination local unit, the same logic channel as that between an originating local unit operative for information transfer and the tandem unit in respect of a call destined for a local unit other than the originating local unit and a device, operable in the originating-side local unit for information transfer, for inserting output port information of a self-routing switch inside the tandem unit into a packet destined for the local unit other than this local unit; in the tandem unit, setting of logic channel conversion information is not required to be done and even when any control signal packet from the originating local unit arrives at the tandem unit, the packet is transferred to the destination local unit without undergoing termination of packet and concomitant call processing control.

2 Claims, 18 Drawing Sheets

U.S. PATENT DOCUMENTS

| | | | |
|---|---|---|---|
| 4,300,230 | 11/1981 | Philip et al. ............................... | 370/63 |
| 4,312,065 | 1/1982 | Ulug ........................................ | 370/94.2 |
| 4,314,367 | 2/1982 | Bakka et al. ............................ | 370/351 |
| 4,322,843 | 3/1982 | Beuscher et al. ......................... | 370/60 |
| 4,345,324 | 8/1982 | Smitt ........................................ | 370/13 |
| 4,398,270 | 8/1983 | Mathieu et al. ........................ | 370/94.1 |
| 4,450,557 | 5/1984 | Munter ...................................... | 370/58 |
| 4,486,875 | 12/1984 | Kelleher .................................... | 369/170 |
| 4,486,878 | 12/1984 | Hauermans ............................... | 370/60 |
| 4,488,289 | 12/1984 | Turner ...................................... | 370/60 |
| 4,491,945 | 1/1985 | Turner ...................................... | 370/60 |
| 4,494,230 | 1/1985 | Turner ...................................... | 370/351 |
| 4,516,238 | 5/1985 | Huang et al. ............................. | 370/60 |
| 4,558,444 | 12/1985 | Kennedy et al. ......................... | 370/63 |
| 4,603,416 | 7/1986 | Servel ........................................ | 370/60 |
| 4,611,322 | 9/1986 | Larson et al. ............................. | 370/60 |
| 4,633,460 | 12/1986 | Suzuki et al. ............................. | 370/581 |
| 4,644,529 | 2/1987 | Amstutz et al. ........................... | 370/60 |
| 4,670,871 | 6/1987 | Vaidya ...................................... | 370/60 |
| 4,679,190 | 7/1987 | Dias et al. ................................. | 370/60 |
| 4,685,104 | 8/1987 | Johnson et al. ........................... | 370/59 |
| 4,686,701 | 8/1987 | Ahmad et al. ........................... | 379/269 |
| 4,698,803 | 10/1987 | Haselton et al. ......................... | 370/60 |
| 4,720,854 | 1/1988 | Sand ........................................ | 370/58.3 |
| 4,751,697 | 6/1988 | Hunter et al. ........................... | 370/68.1 |
| 4,754,451 | 6/1988 | Eng et al. .................................. | 370/60 |
| 4,757,497 | 7/1988 | Deierle et al. ........................ | 370/85.12 |
| 4,760,570 | 7/1988 | Acampora et al. ........................ | 370/60 |
| 4,780,870 | 10/1988 | McHarg et al. ........................... | 370/60 |
| 4,782,478 | 11/1988 | Day, Jr. et al. ............................ | 370/60 |
| 4,785,446 | 11/1988 | Dias et al. ................................. | 370/60 |
| 4,809,261 | 2/1989 | Ratcliff ...................................... | 370/60 |
| 4,866,702 | 9/1989 | Shimizu et al. ........................ | 370/54.3 |
| 4,910,731 | 3/1990 | Sakurai et al. ............................. | 370/60 |
| 4,922,487 | 5/1990 | Eilenberger et al. ...................... | 370/60 |
| 4,947,388 | 8/1990 | Kuwahara et al. ....................... | 370/60 |
| 4,956,839 | 9/1990 | Torri et al. ................................. | 370/60 |
| 4,958,341 | 9/1990 | Hemmady et al. ....................... | 370/60.1 |
| 5,043,979 | 8/1991 | Sakurai et al. ............................. | 370/60 |
| 5,214,640 | 5/1993 | Sakarai et al. ............................. | 370/60 |
| 5,237,571 | 8/1993 | Cotton et al. ............................. | 370/60 |
| 5,239,539 | 8/1993 | Uchida et al. ............................ | 370/60 |
| 5,513,177 | 4/1996 | Sakurai et al. ......................... | 370/58.1 |

FOREIGN PATENT DOCUMENTS

| | | |
|---|---|---|
| 2-12540 | of 0000 | Japan . |
| 0103612 | 8/1979 | Japan . |
| 59-23658 | 2/1984 | Japan . |
| 60-127844 | 7/1985 | Japan . |
| 60-219846 | 11/1985 | Japan . |
| 60-232742 | 11/1985 | Japan . |
| 6160044 | 3/1986 | Japan . |
| 63-169850 | 7/1988 | Japan . |
| 63-305643 | 12/1988 | Japan . |
| 3-143098 | 6/1991 | Japan . |
| 8502735 | 6/1985 | WIPO . |

OTHER PUBLICATIONS

Shuzo Morita et al, "Elastic Basket Switching—A New Integrated Switching System for Voice and High–speed Burst Data", *IEEE,* 1987, p. B711–3.

T. Takeuchi et al., "Synchronous Composite Packet Switching for ISDN Switching System Architecture ", *ISS,* May 7–11, 1984, Florence.

A.K. Elhakeem et al, "Analysis of a Hybrid (Demand Assignment IDMA) Protocol for Video Teleconferencing–Voice Data Optical Networks", *Computer Networks and ISDN Systems,* Mar. 1986, vol. 11, No. 3, pp. 219–241.

R.W. Muisse et al, "Experiments in Wideband Packet Technology", *International Zurich Seminar on Digital Communications,* Mar. 1986, Session D4, pp. 1–5.

S. Gohara et al. "A New Distributed Switching System Architecture for Media Integration", *IEEE Int'l Conference on Communications—Sound,* Jun. 7–10, 1987, Session '11, paper 4, pp. 373–377.

E. Gerretti and R. Melen, "An Internal ATM Switching Architecture for the Evolving B–ISDN Scenario" May 27–Jun. 1, 1990, pp. 15–20.

S. Tanabe et al, "A New Distributed Switching System Architecture for B–IDSN", Oct. 1990.

K. Suzuki, "A Study on the Architecture of the ATM Switching Network", 1989, pp. 37–42.

Y. Sakurai et al, "Asynchronous Transfer Mode Technology For Broadband ISDN", No. 29, 1990, Denshi Tokyo.

"Digital Switching Method", Mar. 15, 1986.

S. Takatsuka et al, "An Input Output Shared Buffer ATM Switch LSI, LSI Design Methodology With Higher Performance", B–462, 1991.

H. Yamanaka, "A High Speed ATM Switch Architecture Based on Multiple Shared Buffer Memories", B–467, Communication Systems Development Laboratory, Mitsubishi Electric Corporation.

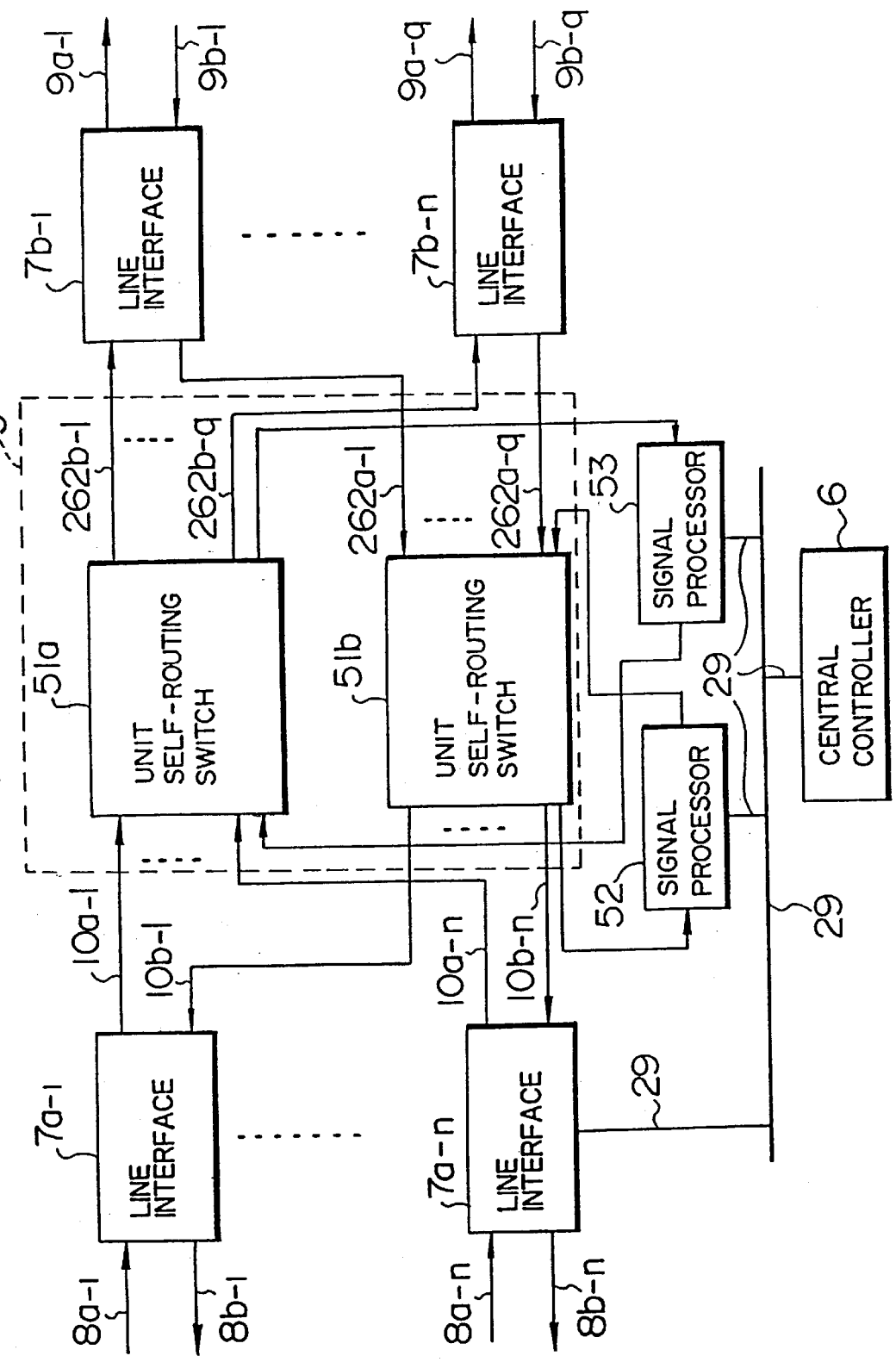

FIG. 10

ORIGINATING-SIDE-ROUTE
IDLE/BUSY TABLE  ROUTE NO.

| 1 1 1 | 1 1 1 0 1 0 |

O: BUSY       1: IDLE

FIG. 11

ORIGINATING-SIDE-ROUTE USE BANDWIDTH
MANAGEMENT TABLE

ROUTE NO.

| $(150)_D$ |
| $(30)_D$ |
| $(100)_D$ |
| ⋮ |
| 0 |

PACKET SWITCHING SYSTEM HAVING SELF-ROUTING SWITCHES

This is a continuation of application Ser. No. 08/438,959, filed May 11, 1995; which is a continuation of application Ser. No. 07/645,491, filed Jan. 24, 1991; which is a continuation-in-part of application Ser. No. 07/096,011, filed Sep. 14, 1987, now U.S. Pat. No. 5,043,979.

BACKGROUND OF THE INVENTION

The present invention relates to the architecture of a packet switching system having self-routing switches.

As described in "Digital Switching System" edited by The Institute of Electronics and Communication Engineers of Japan, Mar. 15, 1986, pp. 128–130, a conventional multi-processor type switching system is so constructed as to use the function distribution and the load distribution in combination wherein the switching processing function is divided into a plurality of blocks which are allotted to individual processors. Additional processors of the same function as that of the individual processors are further provided in accordance with the magnitude of the load.

The function distribution faces the following problems:
(1) A fault of, for example, software in one of the processors influences the whole system very greatly.
(2) The interface between processors depends on the method of dividing the function and with loose interface, the process overhead generally tends to increase.
(3) Even the minimum scale of construction of the system has a plurality of processors. In digital switching systems, even when the load distribution is adopted in order to let one processor (unit) have completely independent function, such control as path setting with respect to each call is required in the tandem unit adapted to perform connection between units, as the capacity of the system increases.

For the purpose of improving the switching throughput, the self-routing switching system is promising being that it realizes packet switching processing using a packet of fixed length, as represented by the asynchronous transfer mode (ATM), in terms of hardware. An example of load distribution architecture of an ATM switching system using self-routing switches is disclosed in "A Study on the Architecture of the ATM Switching Network", Technical Report SSE-38 of The Institute of Electronic Information and Communication Engineers of Japan, Jul. 19, 1989. However in this example, a module for coupling distributed modules includes a control processing for performing a packet header processing, raising a similar problem to that in function distribution as described above.

In the aforementioned conventional systems, a switching unit (tandem unit) adapted to couple switching units for load distribution (local units) must perform control for path setting in respect of each call and the control signal must be terminated so as to carry out part of the switching processing. This leads to problems that reliability of the tandem unit causes a bottleneck in the system and even the minimum construction needs the tandem unit together with the local units.

SUMMARY OF THE INVENTION

A first object of the invention is to construct a complete load distributed architecture in a distributed type packet switching system by providing a local unit with a independent call processing switching function and causing a tandem unit to perform only the switching operation by a self-routing switch without effecting any call processing control corresponding to a control signal and including termination of the control signal.

A second object of the invention is to execute the outgoing route control handling resources of the system in the above load distributed architecture without using the common access unit/common memory.

To accomplish the first object, according to one aspect of the invention, a packet switching system is constructed such that an output port of a self-routing switch inside a tandem unit is designated in an originating local unit; a single virtual channel (VC) is set up between originating and destination local units and a virtual channel identifier (VCI) of the VC is determined in the destination local unit; and bandwidth allotment between the local unit and tandem unit is managed by the local unit.

To accomplish the second object, according to another aspect of the invention, a packet switching system is constructed such that a bandwidth allotment condition corresponding to an outgoing route is stored with respect to each local unit; when the bandwidth use condition is changed, all of the other local units are informed of the change; and all of the other local units are periodically informed of the bandwidth use condition.

When a call is originated, a start signal including a circuit bandwidth allotment condition between a call originating local unit and the tandem unit is transferred from the call originating local unit to a destination local unit and in the destination local unit, an optimum route between local units is selected in accordance with the originating circuit bandwidth allotment condition and the circuit bandwidth allotment condition between the destination local unit and the tandem unit. A VCI on that circuit is hunted and a start completion signal including this information is returned to the originating local unit. When receiving the start completion signal, the originating local unit sets, on the basis of the selected route, output ports of individual self-routing switches inside the originating local unit, tandem unit and destination local unit in a label conversion table, and adds this information to a subsequently transferred user information packet.

BRIEF DESCRIPTION OF THE DRAWINGS

FIG. 5 is a block diagram showing an example of construction of a local unit;

FIGS. 10 and 11 show route management tables;

DESCRIPTION OF THE PREFERRED EMBODIMENTS

A preferred embodiment of the invention will now be described with reference to the accompanying drawings.

1. Explanation of Construction 1.1 Construction of Switching System

Figure 1:
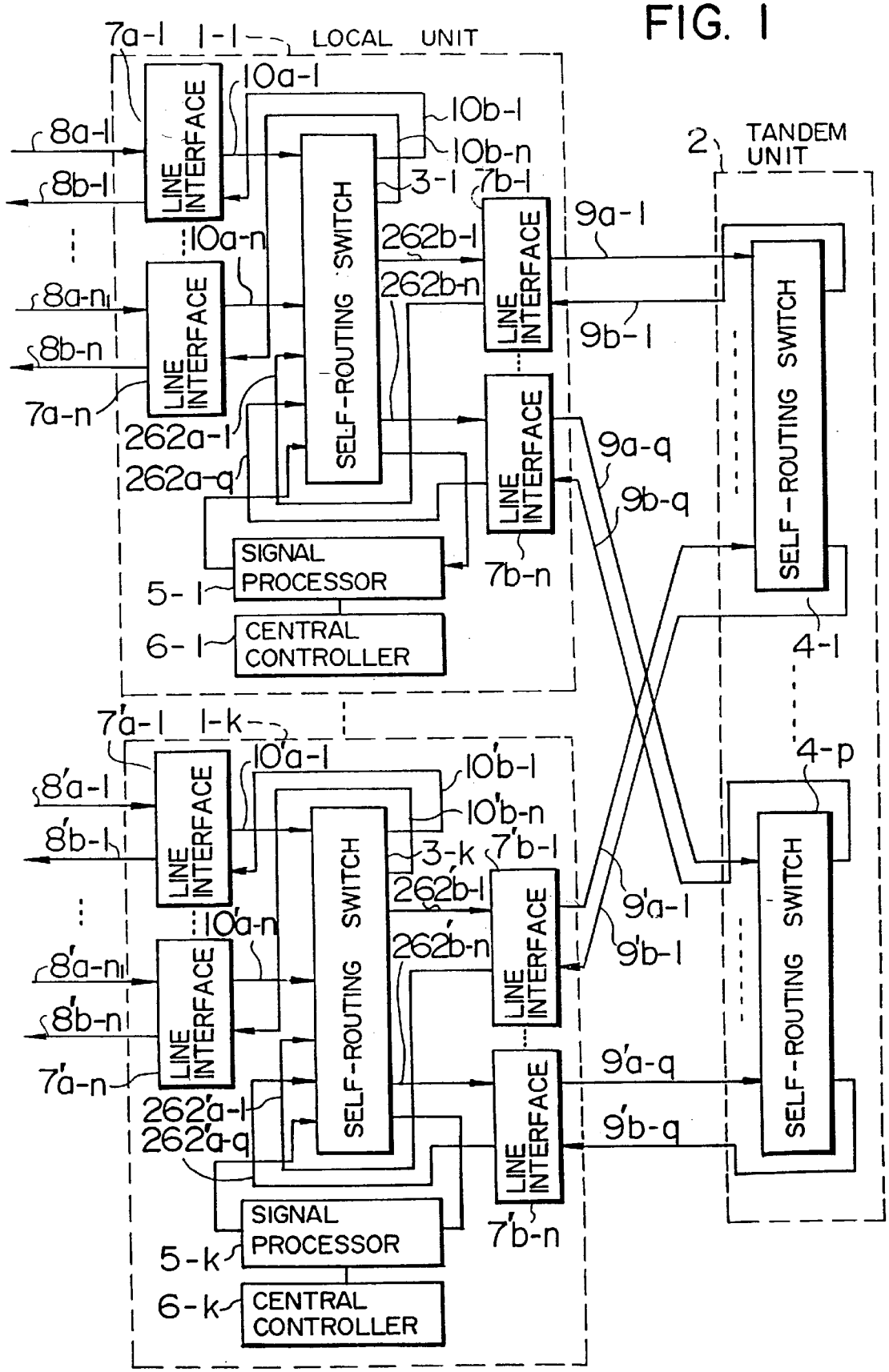
FIG. 1 is a schematic block diagram showing a packet switching system according to an embodiment of the invention.

FIG. 1 shows an example of construction of a self-routing packet switching system to which the invention is applied. This switching system comprises k local units (1-*l* to 1-*k*) each accommodating (8-*l* to 8-*n*) packet circuits, and a single tandem unit 2 coupled to the local units. Each local unit 1 includes a self-routing switch 3 for switching a packet through self-routing operation, a signal processor 5 for processing control signals, a central controller 6 for managing call processing control and call resource, and line interfaces 7 for performing line termination, such as optoelectric conversion, synchronous control and label conversion. The tandem unit 2 includes a plurality of self-routing switches (4-*l* to 4-*p*). Each local unit 1 and the tandem unit 2 are coupled together by packet circuits (9-*l* to 9-*q*) between desired originating and destination local units, a plurality of routes run through the self-routing switches (4-*l* to 4-*q*) in the tandem unit 2.

It is to be noted that the construction of FIG. 1 is an improvement based on U.S. Pat. No. 5,043,979 assigned to the same assignee of the present application. The relation between the FIG. 1 construction and the U.S. Pat. No. 5,043,979 (hereinafter referred to as a prior patent) will be described herein.

Firstly, the local units (1-*l* to 1-*k*) in FIG. 1 of the present patent correspond to front-end modules FM (201 to 208) in FIG. 1 of the prior patent, and the tandem unit 2 of the present application corresponds to central module CM 100 of the prior patent. In the prior patent, the FM's are described as being sorted into SM's connected to subscriber lines and TM's connected to trunk lines but the SM and TM have substantially the same construction. Also, while in the prior patent, the FM's are described as being sorted into up-FM's and down-FM's (for example, FM's 201 and 203), up- and down-FM's in the present application are described as being incorporated in one block (for example, local unit 1-*l*), that is, the up-and down-FM's are described as being disposed on the same side in one block with respect to the tandem unit, but the substance is the same for the prior and present applications.

Further, process/control unit 405 (FIG. 6) in the front-end module FM of the prior patent corresponds to the signal processor (5-*l* to 5-*k*) and central controller (6-*l* to 6-*k*) in FIG. 1 of the present application which are adapted to perform idle/busy management of circuits and call control. Differently, however, in the present application, the respective self-routing switches (3-*l* to 3-*k*) are incorporated in the respective local units (1-*l* to 1-*k*).

In addition, the format in FIG. 4 of the prior patent corresponds to fixed-length blocks (cells) to be described later with reference to FIG. 6A to 6C of the present application.

1.2 Construction of Line Interface

Figure 2:
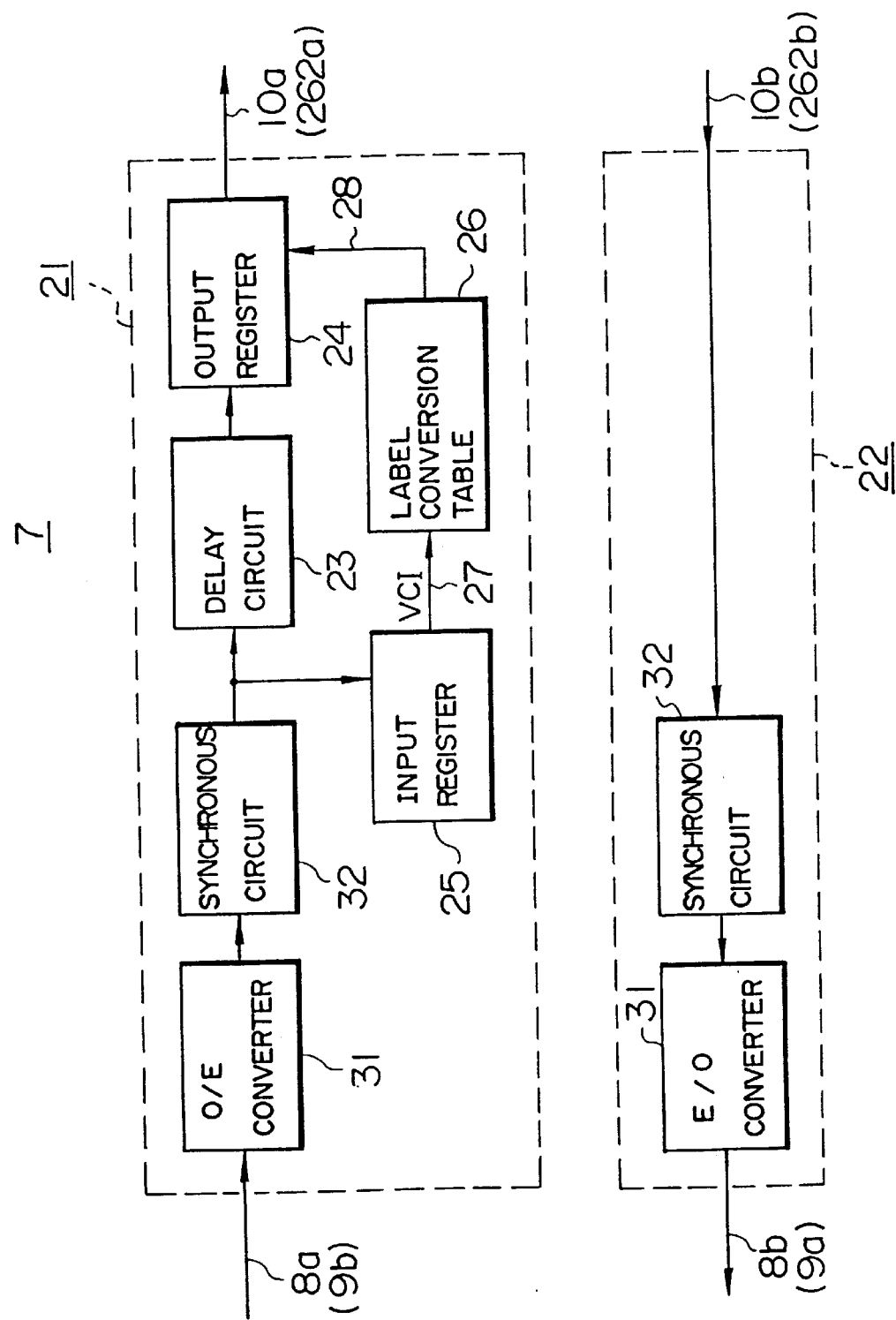
FIG. 2 is a block diagram of a packet line interface.

The line interface 7 has a circuit construction as shown in FIG. 2. Interfaces 7*a* and 7*b* respectively include an up-circuit 21 and a down-circuit 22, the up-circuit being operable to process a packet on an incoming circuit 8*a* of the switching system (this incoming circuit corresponds to a subscriber line or a trunk line between the system of interest and another network system) or a packet on an incoming circuit 9*b* (this incoming circuit corresponds to an incoming circuit between units) to deliver the processed packet to a packet circuit 10*a* or 262*a* connected to the self-routing switch 3-*l* in the local unit 1-*l*, and the down-circuit being operable to process a packet on an outgoing circuit 10*b* or 262*b* to deliver the processed packet to an incoming circuit 8*b* or 9*a*. As the common function components, the up-circuit 21 has an optoelectric (O/E) converter 31 for optoelectric conversion and a synchronous circuit 32 for synchronous control and the down-circuit 22 has an electrooptic (E/O) converter 31 for electrooptic conversion and a synchronous circuit 32. In the up-circuit 21, the incoming circuit 8*a* (9*b*) then connects to an input register 25 and to an output register 24 through a delay circuit 23. A line 27 for taking out a virtual channel identifier (VCI) leads from the input register 25 and the taken-out VCI serves as a read address for a label conversion table 26. A data output line 28 leading from the label conversion table 26 connects to the output register 24 and the outgoing circuit 10*a* of the output register 24 connects to the tandem unit 2.

1.3 Label Conversion Table

Figure 3:
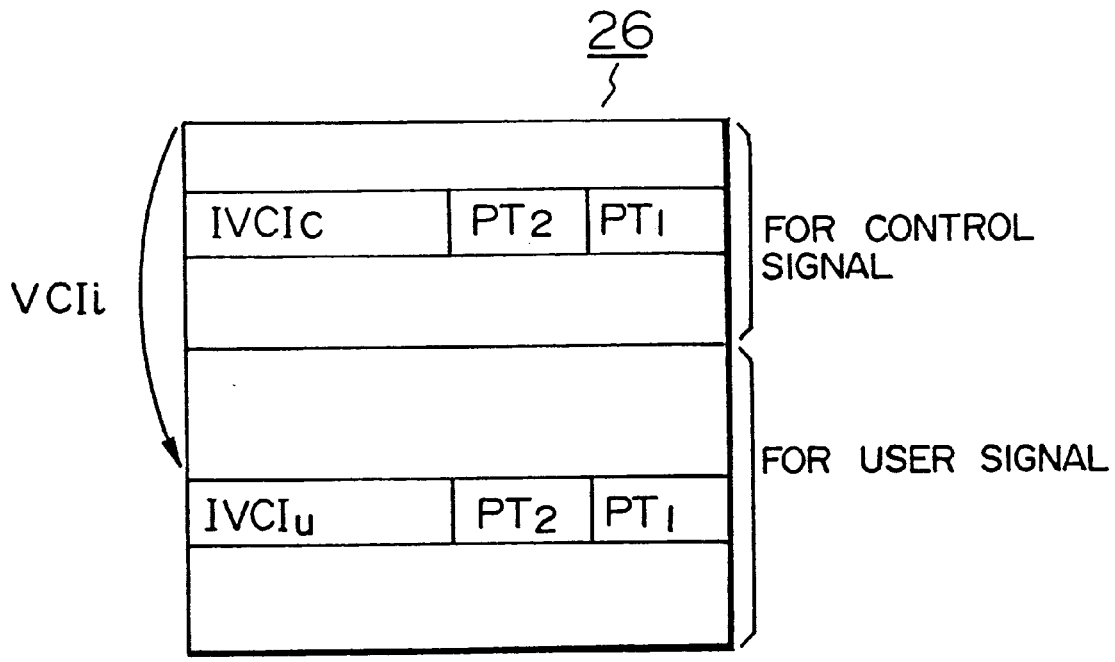
FIGS. 3, 4 and 19 show label conversion tables.
Figure 4:
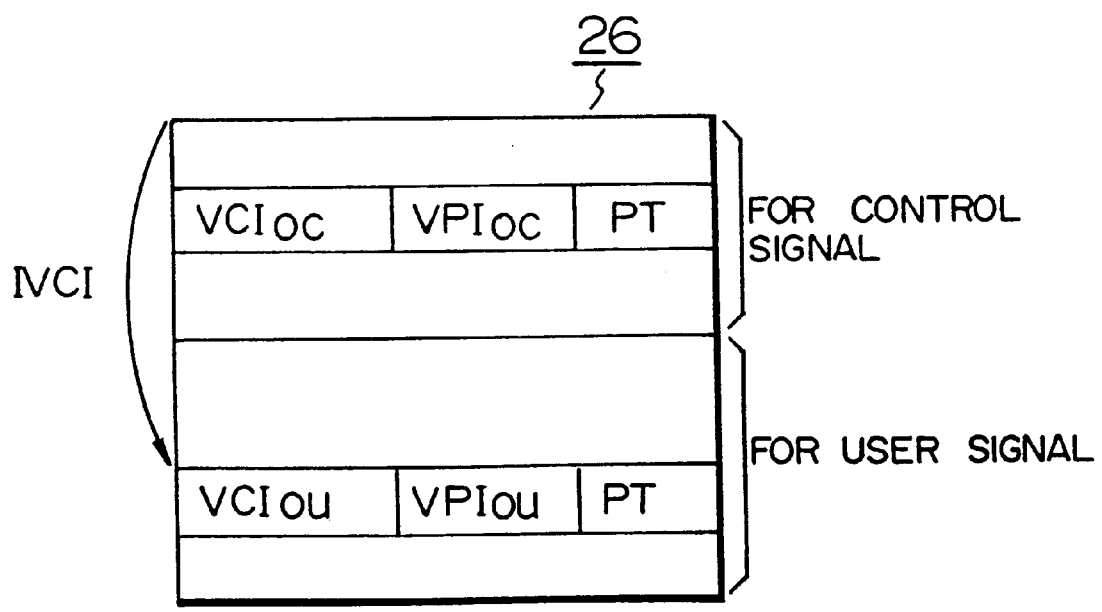

FIG. 3 shows a label conversion table in the line interface 7*a* connected to the switching system incoming circuit 8 and FIG. 4 shows a label conversion table in the line interface 7*b* connected to the circuit 9 between the local and tandem units. The conversion table of FIG. 3 is divided into a VCI area for control signal and a VCI area for user information and in respect of a VCI on the incoming circuit 8*a* (VCIi), the conversion table is set with a VCI on a circuit between the tandem unit and a destination local unit (this VCI is termed IVCI), an output port number PT1 of self-routing switch 3 in an originating local unit and an output port number PT2 of self-routing switch 4 in the tandem unit.

The label conversion table of FIG. 4 is also divided into a control signal area and a user information area as in the precedence and in respect of an IVCI on the incoming circuit 9*b* from the tandem unit 2, it is set, in its control signal area, with an outgoing circuit control VCI (VCIoc), an outgoing circuit control virtual path identifier (VPI) or (VPIoc) and an output port number PT of self-routing switch 3 in a destination local unit 3 and, in its user information area, with an outgoing circuit user information VCI (VCIou), an outgoing circuit user information VPI (VPIou) and a PT.

1.4 Construction of Self-routing Switch

The self-routing switch 3 or 4 is packet switch operable to select an outgoing circuit in accordance with output port information in a packet and may be constructed of either a single switch or a plurality of unit switches.

The self-routing switch 3 in the local unit is constructed as shown in FIG. 5, including an up-circuit unit self-routing switch 51*a* receiving the output line 10*a* of the line interface (7*a*-*l* to 7*a*-*n*) connected with the incoming circuit (8*a*-*l* to 8*a*-*n*) and a down-circuit unit self-routing switch 51*b* receiving the outgoing circuit 262*a* of the line interface (7*b*-*l* to 7*b*-*n*) connected with the circuit (9*b*-*l* to 9*b*-*q*) from the tandem unit. The up-circuit unit self-routing switch 51*a* has output lines (262*b*-*l* to 262*b*-*q*) connected to the line interface 7*b* connected with the tandem unit 2, and the down-circuit unit self-routing switch 51*b* has output lines (10*b*-*l* to 10*b*-*n*) connected to the line interface (7*a*-*l* to 7*a*-*n*).

The up-circuit unit self-routing switch 51*a* connects to an up-circuit signal processor 53 and the down-circuit unit self-routing switch 51b connects to a down-circuit signal processor 52, the signal processors being connected to the central controller through a processor bus 29.

1.5 Structure of Packet Format

Figure 6A:
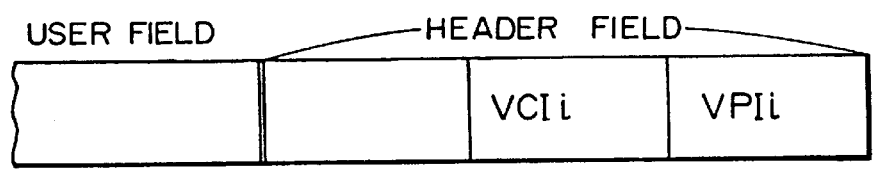
FIGS. 6A to 6C show packet formats.
Figure 6B:
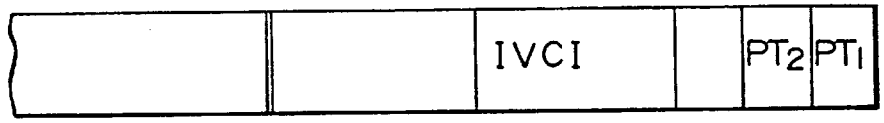
Figure 6C:
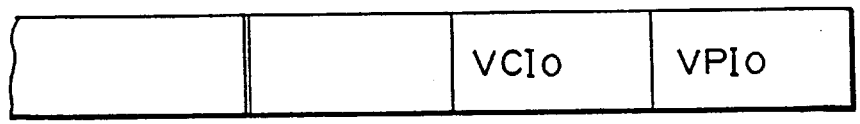

FIGS. 6A, 6B and 6C show structures of packet formats on different circuits. A packet is divided into a header field and a user field and the header field contains a VCI area and a VPI area. As shown in FIG. 6A, a packet format on the incoming circuit 8a to an originating local unit has an incoming circuit VCI (VCIi) and an incoming circuit VPI (VPIi) which are set in its packet header field. FIG. 6B shows a packet format on a circuit between a line interface (for example, 7a-l) of the originating local unit 1-l and a line interface (for example, 7′b-l) of a destination local unit (for example, 1-K), that is to say, for example, the circuit 10 between line interface 7a and self-routing switch 3 and the circuit 9 between local unit 1 and tandem unit 2. In the packet format of FIG. 6A, an IVCI is set in the VCIi area and an output port number PT1 of self-routing switch 3-l of the originating local unit 1-l and an output port number of self-routing switch 4 of the tandem unit 2 are set in the VPIi area. As shown in FIG. 6C, a packet format on an outgoing circuit 8b of the destination local unit 1-k is set with an outgoing circuit VCI (VCIo) and an outgoing circuit VPI (VPIo).

1.6 Construction of Integrated Node System

Figure 18:
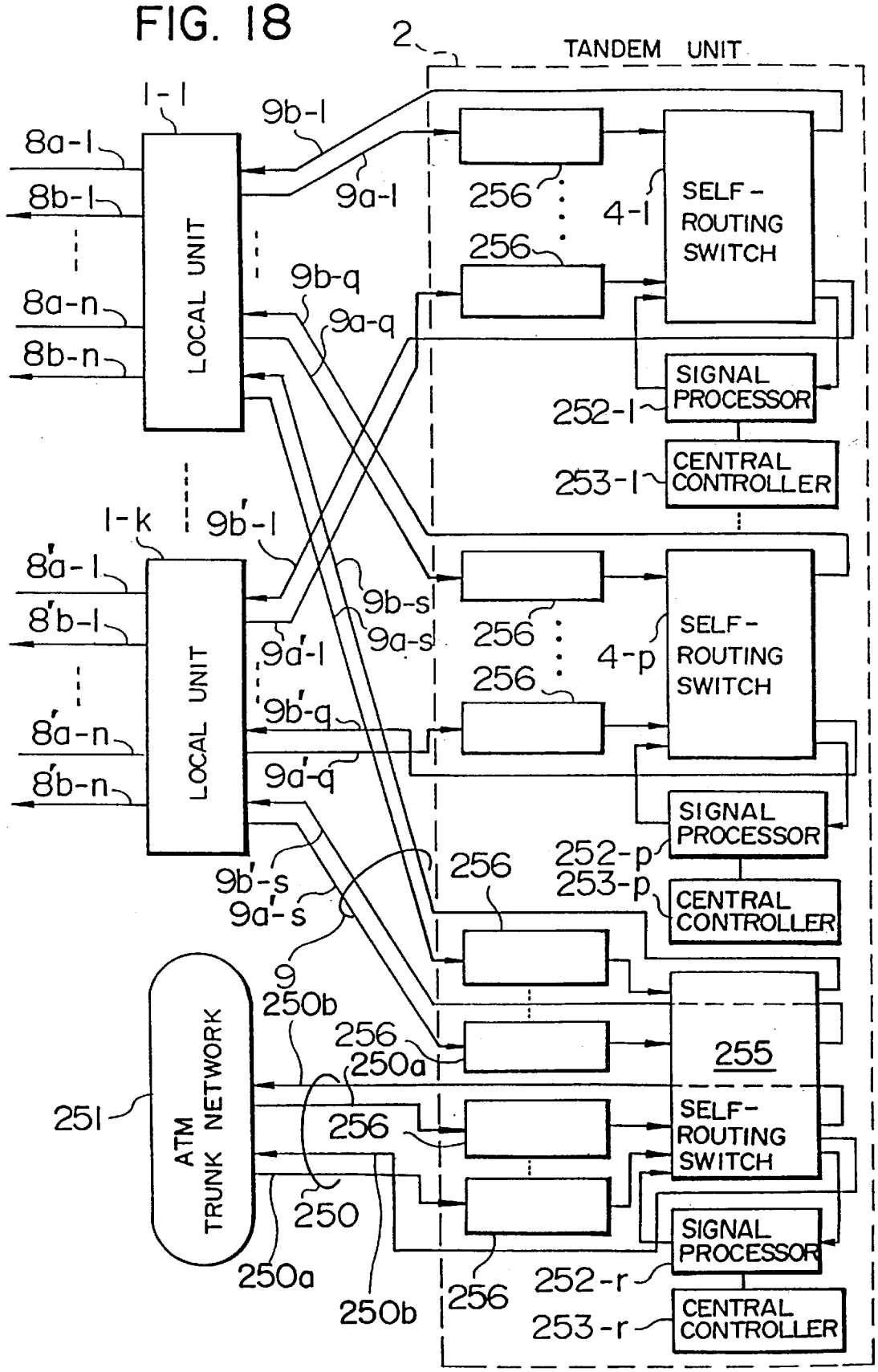
FIG. 18 is a schematic block diagram showing an integrated node system according to another embodiment of the invention; and, FIG. 20 is a schematic block diagram showing a packet switching system comprising local units alone according to still another embodiment of the invention.

FIG. 18 shows an example of the construction wherein the previously described packet switching system is added with the ATM cross connecting function. The tandem unit 2 with the self-routing switches (4-l to 4-p) operable for connection between local units is additionally provided with a self-routing switch (255) for cross connecting which is connected to an ATM trunk network 251. The cross connecting self-routing switch (255) is coupled to a single or a plurality of local units through a packet circuit 9 and is also coupled to the ATM trunk network 251 through a packet circuit 250. Each self-routing switch (4-l to 4-p; 255) in the tandem unit 2 is preceded by up-circuits 256 of line interface. The up-circuit 256 in FIG. 18 has the construction resembling the block 21 of FIG. 2 and its input register takes out a VPI from the cell header to deliver the VPI to the label conversion table 26. Further, a signal processor 252 for initialization of the label conversion table and a central controller 253 are provided in association with each self-routing switch.

Figure 19:
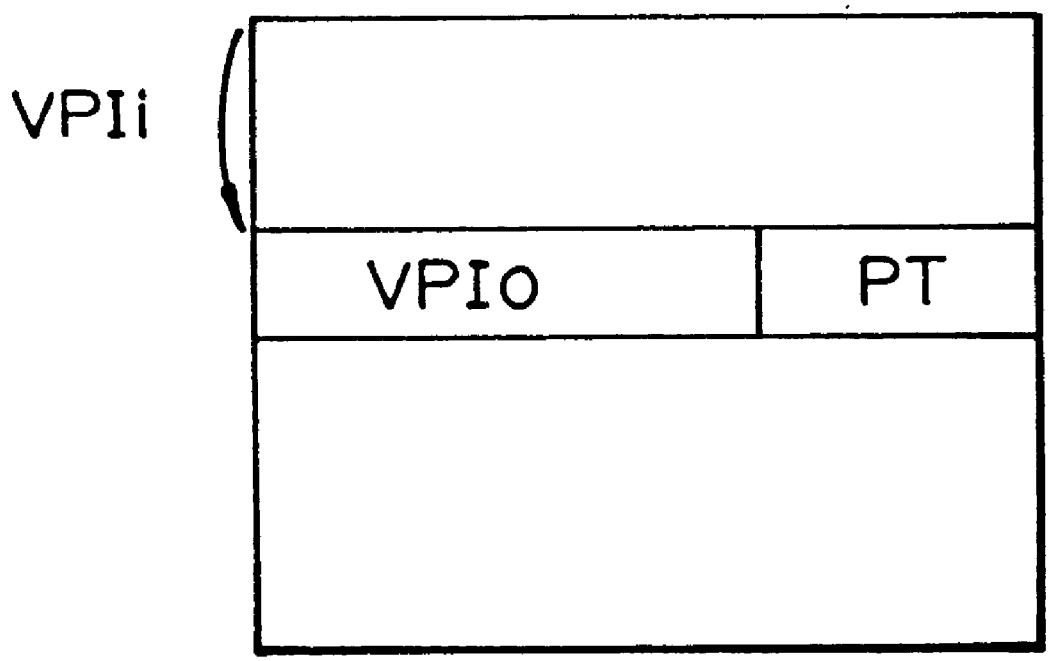

FIG. 19 shows a structure of the label conversion table 26 in the line interface of the tandem unit 2. In accordance with a VPI (VPIi) on the incoming circuit (9a; 250a), an output port number PT of the self-routing switch (4; 255) and a VPI (VPIo) on the corresponding outgoing circuit (9b; 250) are set.

Thus, the packet format on the incoming circuit 8 connected to the terminal is shown in FIG. 6A, the packet format on the circuit 9 between the local and tandem units is shown in FIG. 6B and the packet format on the circuit 250 between the ATM trunk network 251 and tandem unit 2 is shown in FIG. 6C.

2. Explanation of Operation

From the standpoint of connection destination, calls handled by the switching system may be classified into a call to be terminated at a station of interest (i.e this station), which call is destined for this station and a call to go out to another station, which call leaves a station for a different station.

2.1 Call to Be Terminated at This Station

The call to be terminated at this station is sorted into a call inside this station which is originated from a terminal inside this station and an incoming connection call standing for a call which is originated from another station and destined for this station. Here, the invention will be described by way of a call inside this station.

Figure 7:
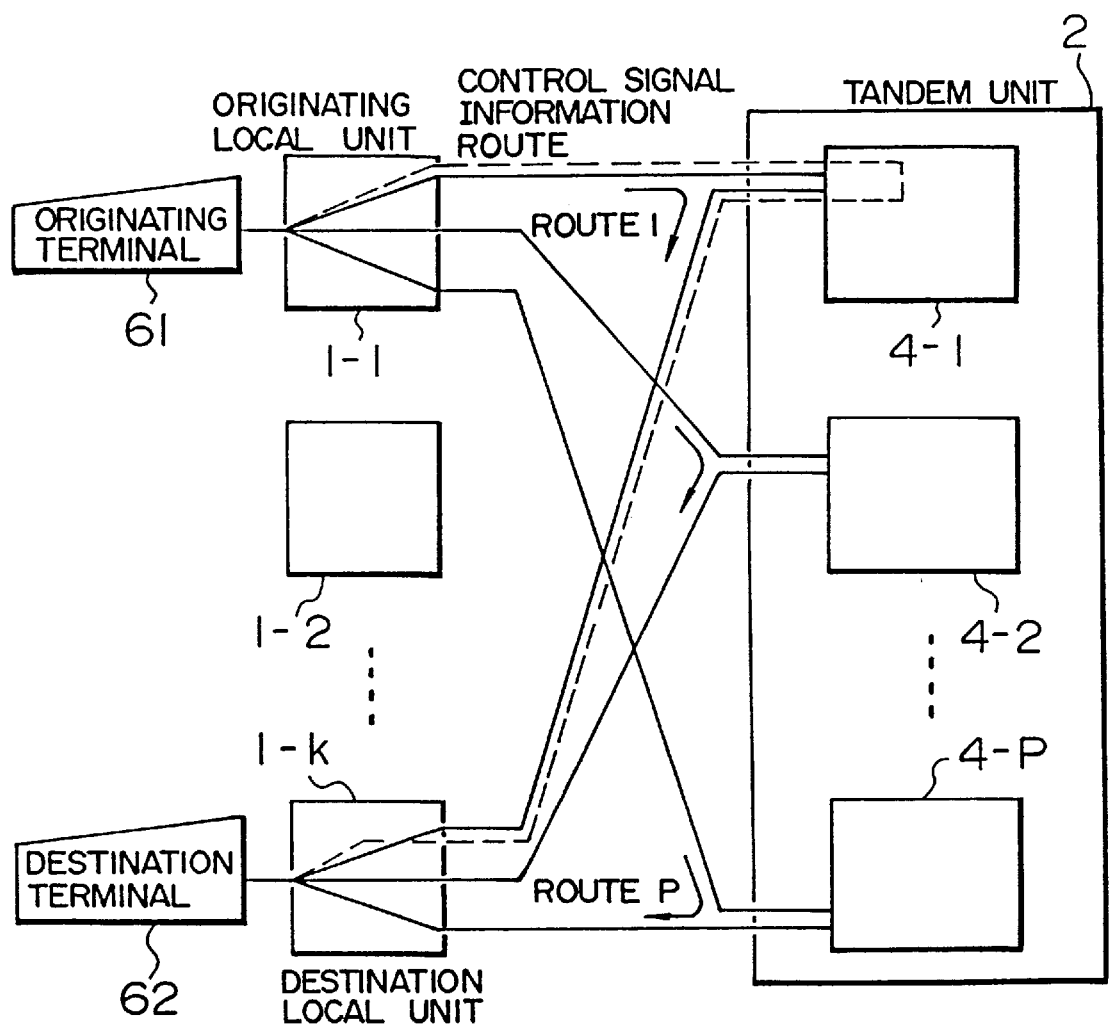
FIG. 7 is a diagram showing the routing architecture between originating and destination local units.

FIG. 7 shows an example wherein a call originated from a terminal 61 connected to the local unit 1-l is destined for a terminal 62 connected to the local unit 1-k. The local unit 1-l, the local unit 1-k, the terminal 61 and the terminal 62 will hereinafter be termed an originating local unit, a destination local unit, an originating terminal and a destination terminal, respectively. The route for transfer of control signal information between the originating and destination terminals is fixedly allotted (in this example, allotted to route l) and the user information transfer route is selected from routes 1 to p.

Following the origination of a call by the originating terminal 61, the switching system operates as will be described with reference to FIG. 8.

[Transmission Processing]

Figure 9:
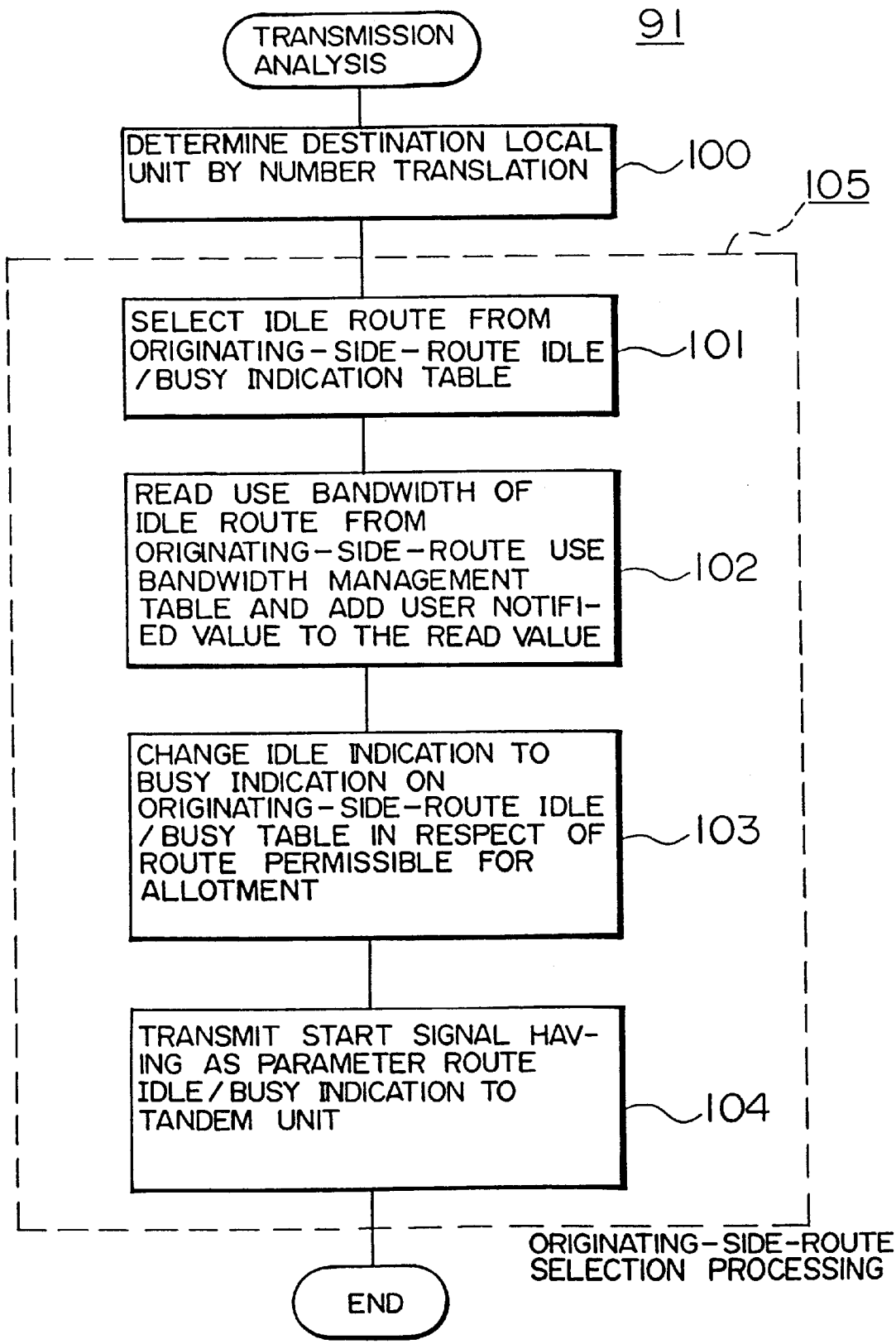
FIG. 9 is a transmission processing flow chart.

An origination call signal packet from the originating terminal is inputted to the line interface 7 through the incoming circuit 8a in FIG. 1. At that time, the packet format is as shown in FIG. 6A and set, in its VPIi area, with a control signal VPIic and, in its VCIi area, with a user information VCIic. Turning to FIG. 2, the VCI area of the packet header field is separated from the input register 25 and its value, VCIic, appearing on the data line 27 accesses the label conversion table 26. In the conversion table 26 as detailed in FIG. 3, an IVCI and PT information are set in an address (control signal area) corresponding to the control signal VCIic. As the IVCI, a value allotted in correspondence to the incoming circuit number is fixedly set and as PT1 of the PT information, an outgoing circuit number of a unit self-routing switch 51a connected with a signal processor (for example, 53 in FIG. 5) in the originating local unit 1-l is set. (PT2 and PT3 are not used here.) The IVCI and PT information are produced on the data line 28 and delivered to the output register 24 where they are inserted in the packet header field. In this phase, the packet format is as shown in FIG. 6B. This packet is inputted to the up-circuit self-routing switch 51a of FIG. 5 through the circuit 10a and switched to the signal processor 53 in accordance with PT1 in the packet header. The signal processor 53 then performs signal processings such as packet assembly processing and link access procedure on the D-channel (LAPD) and thereafter a transmission analysis program 91 as shown in FIG. 9 is started in the central controller 6.

In the transmission analysis program 91, a number (receiving number) dialed, by the originating terminal 61 and contained in the originating call is translated to determine the destination local unit 1-k (100). Then, an originating-side-route idle/busy table of FIG. 10 which indicates the idle/busy state in terms of one bit in respect of the routes (routes l to p) between local units (in this example, 0/1 corresponds to busy/idle) is read to detect an idle route (101). Subsequently, a use bandwidth corresponding to the idle route is read out of an originating-side-route use bandwidth management table and the read use bandwidth is added with a user notified bandwidth contained in the originating call signal (102). Thus, in respect of a route for which a bandwidth resulting from the addition exceeds an allotment limit value, idle indication is changed to busy indication (103) and a start signal having as parameters a bit pattern indicative of the idle/busy of the route and the user notified value is transmitted to the tandem unit (104).

The start signal is transferred from the central controller 6 to the up-signal processor 53 where the start signal is decomposed into a packet, the packet header of which is set with PT1 and PT23 corresponding to the route 1 (FIG. 7) fixedly allotted in correspondence to the destination local unit 1-$k$. In accordance with the routing information in the packet header, this start signal arrives at the line interface 7'$b$ of the destination local unit 1-$k$ through the self-routing switch 3-$l$ of originating local unit 1-$l$ and the self-routing switch 4-$l$ of the tandem unit. In the line interface 7'$b$, the label conversion table as shown in FIG. 4 has the control signal area from which outgoing circuit VCIoc and VPIoc and an output port number PT of the self-routing switch 3-$k$ to which the signal processor 5-$k$ is connected are read and inserted into the header field. In accordance with the PT information, the packet is so switched by the self-routing switch 3-$k$ as to be destined for the signal processor 5-$k$ of FIG. 1 in the destination local unit 1-$k$ (corresponding to the down-packet signal processor 52 in FIG. 5).

[Termination Processing]

Figure 12:
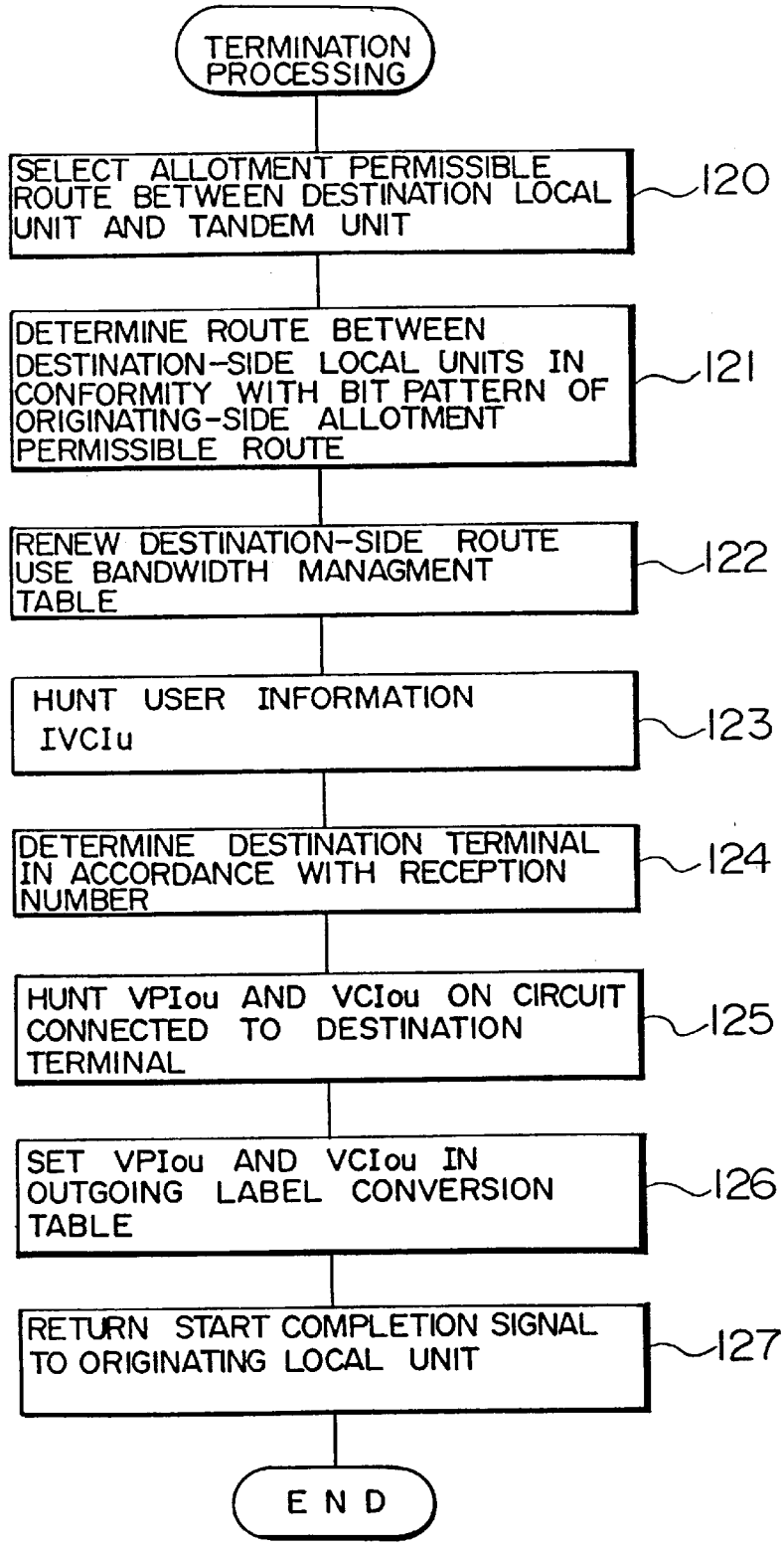
FIG. 12 is a termination processing flow chart.

When the start signal arrives at the destination local unit, the program proceeds as follows. In the signal processor 52 receiving the start signal, signal processings such as packet assembly and LAPD are carried out as in the processing in the originating local unit and thereafter a termination analysis program 92 in the central controller 6 is started. A process flow of the termination analysis program 92 is shown in FIG. 12. Firstly, a route which is allowed to be allotted between the destination local unit 1-$k$ and the tandem unit is selected (120). In this processing, as in the case of the originating route selection, a destination-side route idle/busy table (corresponding to FIG. 10) which indicates the idle/busy state in terms of one bit in respect of each route is read so that an idle route may be detected. Subsequently, a use bandwidth corresponding to the idle route is read out of a destination-side-route use bandwidth management table and the read use bandwidth is added with a user notified bandwidth contained in the start signal. Thus, in respect of a route for which a bandwidth resulting from the addition exceeds an allotment limit value, idle indication is changed to busy indication and a bit pattern indicative of the idle/busy of the destination-side route is determined. The destination-side idle/busy bit pattern and the originating-side idle/busy bit pattern in parameters of the start signal are AND-ed to select an idle route (121). Then, a use bandwidth of the selected route in the destination-route bandwidth management table is renewed in accordance with the user notified value (122). When the renewed result reaches an allotment limit value, the destination-side-route idle/busy table is also renewed from idle to busy. After a user information IVCIu on the selected route is hunted (123), an accommodation position of the destination terminal 62 is determind in accordance with a reception number in the received packet (124) and a circuit PT connected to the destination terminal and VPIou and VCIou on the channel are hunted (125). The VPIou, VCIou and PT are set in an area (user information area) corresponding to IVCIu of a label conversion table in the destination local unit 1-$k$ through the processor bus 29 coupled to the central controller (126). There-after a start completion signal having as parameters the user notified value, route permissible for allotment (the route determined in step 121) and hunted IVCIU is transmitted to the originating local unit (127). Like the start signal transmission processing in the originating local unit, the start completion signal transmission processing is such that the signal packet is transferred from central controller 6 to signal processor 53 and in this signal processor 53, the signal packet is decomposed into a packet, the packet header of which is set with PT1 and PT2 corresponding to the route 1 fixedly allotted in correspondence to the originating local unit 1-$l$. in accordance with the routing information in the packet header, this start completion signal arrives at the self-routing switch 3-$k$ of destination local unit 1-$k$, the self-routing switch 4-$l$ of tandem unit 2 and the line interface 7$b$ of originating local unit 1-$l$. In the line interface 7$b$, the label conversion table as shown in FIG. 4 has the control signal area from which outgoing circuit VCIoc and VPIoc and an output port number PT of the self-routing switch 3-$l$ connected with the signal processor 5-$l$ are read and inserted in the header field. In accordance with the PT information, the packet is so switched by the self-routing switch 3-$l$ as to be destined for the signal processor 5-$l$ of FIG. 1 in the destination local unit 1$k$ (corresponding to the down-packet signal processor 52 in FIG. 5).

[Start Completion Processing]

Figure 13:
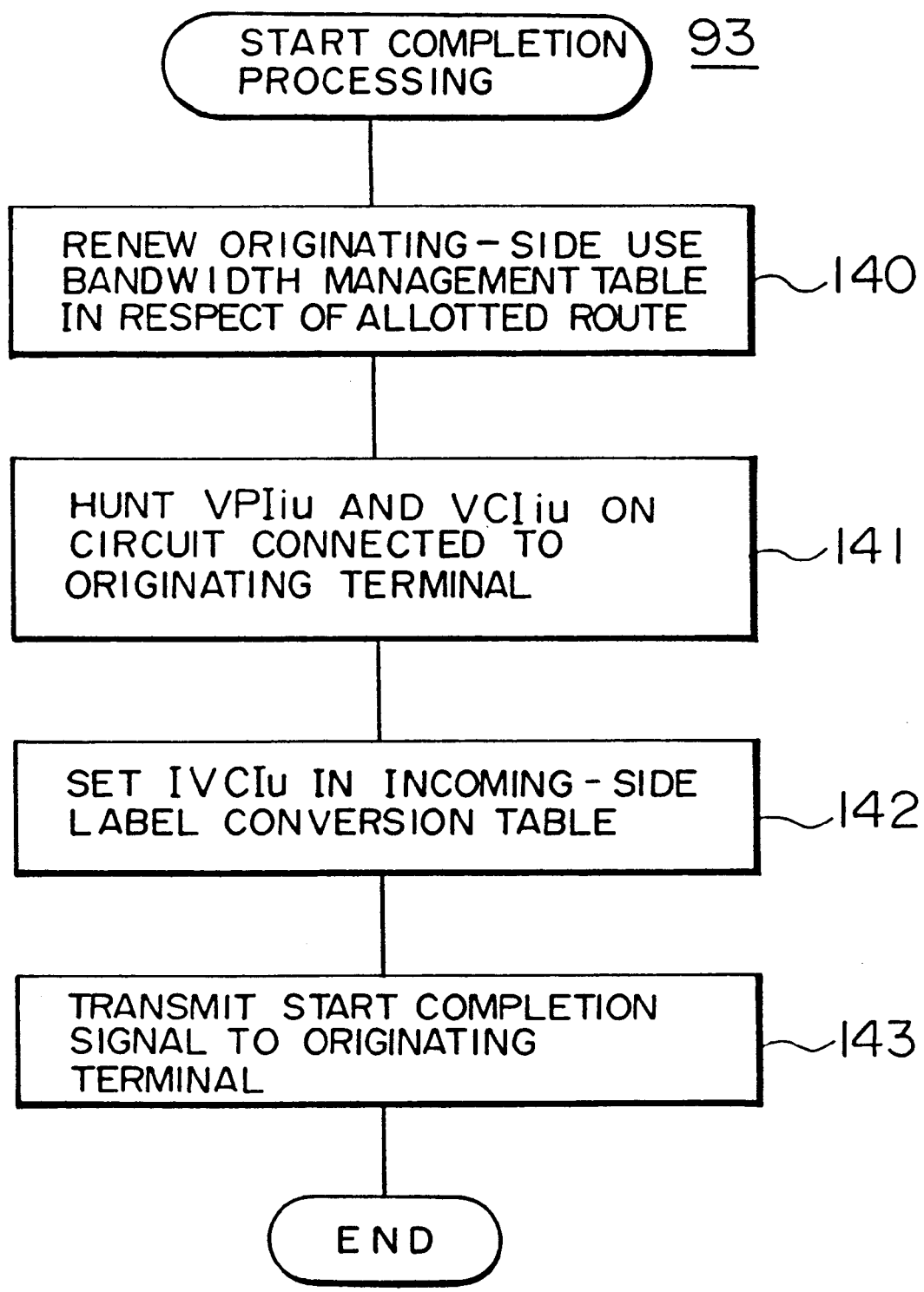
FIG. 13 is a start completion processing flow chart.

When the start completion signal arrives at the originating local unit, the program proceeds as follows. In the signal processor 52 (FIG. 5) receiving the start signal, signal processings and packet assembly are carried out and thereafter a start completion processing program 93 in the central controller 6 is started. A process flow of the start completion processing program 93 is shown in FIG. 13. The originating-side-route use bandwidth management table of FIG. 11 is renewed in respect of an allotted route in parameters of the signal (140). VPIiu and VCIiu on the circuit connected to the originating terminal 61 (FIG. 7) are hunted (141). Parameter IVCIu in the start completion signal and the output port information PT1, PT2 are set in an area (user information area), corresponding to the VCIiu, of the label conversion table through the processor bus 29 coupled to the central controller. The output port information is determined in accordance with the route between the originating and destination local units.

Through the above procedure, the call setting processing is completed.

[Upon Transfer of Information]

Following call setting, a user information packet 78 from the originating terminal 61 and having in its packet header the VPIiu and VCIiu arrives at the originating local unit 1-$l$. The operation in this phase will now be described.

In the up-circuit 21 of FIG. 2, the VCI area of the packet header field is separated from the input register 25 and its value, VCIic, appearing on the data line 27 accesses the incoming-side label conversion table 26. In the incoming-side conversion table 26 as detailed in FIG. 3, the IVCIu hunted upon call setting and the selected output port information PT1, PT2 are set in an address corresponding to the user information VCIiu. The IVCIu and the PT information are sent through the data line 28 to the output register 24 where they are inserted in the packet header field. This packet is sent through the circuit 10-$a$ to the self-routing switch 3-$l$ by which it is switched in accordance with the PT1 in the packet header so as to be transferred to the tandem unit 2 through a circuit, for example, 9$a$-$q$. In the tandem unit 2, the packet is then switched by self-routing switch 4-$q$ in accordance with the PT2 in the packet header so as to arrive at the line interface 7'$b$-$l$ in the destination local unit 1-$k$ through the circuit 9'$b$-$l$. In the up-circuit 21 of FIG. 2, the VCI area of the packet header field is separated from the input register 25 and its value, IVCIu, appearing on the data line 27 accesses the label conversion table 26. In the conversion table 26, circuit PT connected with the destination terminal 62 and VPIou and VCIou on that circuit are set in an address corresponding to the user information IVCIu. The circuit PT and VPIou and VCIou are sent through the data line 28 to the output register 24 where they are inserted into the packet header field. In accordance with the PT in the packet header, this packet is so switched by the self-routing switch 3-k in the destination local unit 1-k as to be destined for a line interface connected to the destination terminal, for example 7'a-l. The user information packet with the inserted VPIou and VCIou arrives at the destination terminal 62 through an outgoing circuit 8'b-l.

2.2 Call to go out to Another Station

An outgoing call destined to another station is sorted into an outgoing call which is originated from a terminal of this station and a tandem call which is originated from another station and arrives at this station. The following description will be given by way of the outgoing call transmitted from this station.

[Sequence of Selection of Outgoing Route]

Typically, a switching system is connected with a plurality of outgoing routes (routes running to another switching system) and in accordance with a result of translation of a received dial number, one of the outgoing routes is selected and a necessary bandwidth is assigned on the selected route. If the assignment fails, a necessary bandwidth is reassigned on a predetermined by-pass route. The route to be selected initially is called a first route and the by-pass route is called a second route.

Figure 14:
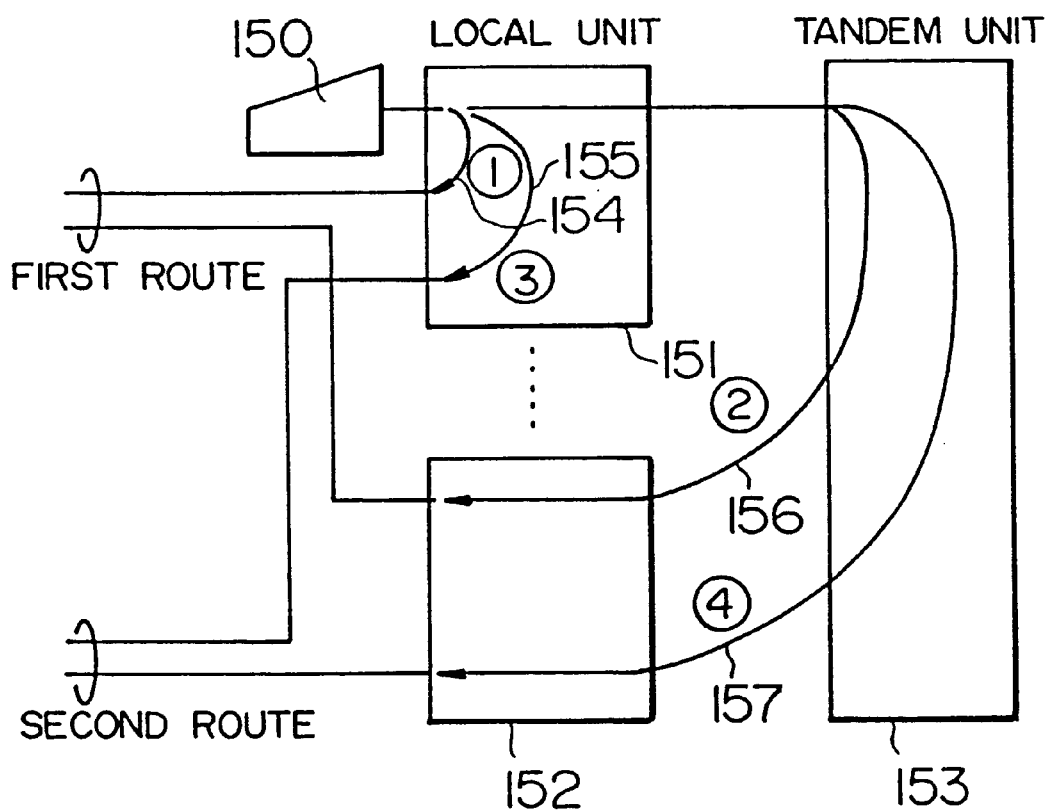
FIG. 14 is a diagram showing outgoing route selection sequence.

In a distributed type switching system in which a plurality of local units exist, when a plurality of circuits are to be accommodated in the same route from a switching system, the circuits are accommodated by distributing each of the first and second routes to a plurality of local units as shown in FIG. 14, in consideration of risk deconcentration.

In respect of a call originating from a terminal 150 in a local unit 151 shown in FIG. 14, a route is selected in accordance with the following sequence.
(1) A first route for accommodating this local unit 151 is selected.
(2) If the above route in (1) is busy, a first route for accommodating another local unit (for example, 152) is selected.
(3) If the above route in (2) is busy, a second route for accommodating this local unit 151 is selected.
(4) If the above route in (3) is busy, a second rote for accommodating the second local unit (for example, 152) is selected.

<Transmission Processing>

Figure 8:
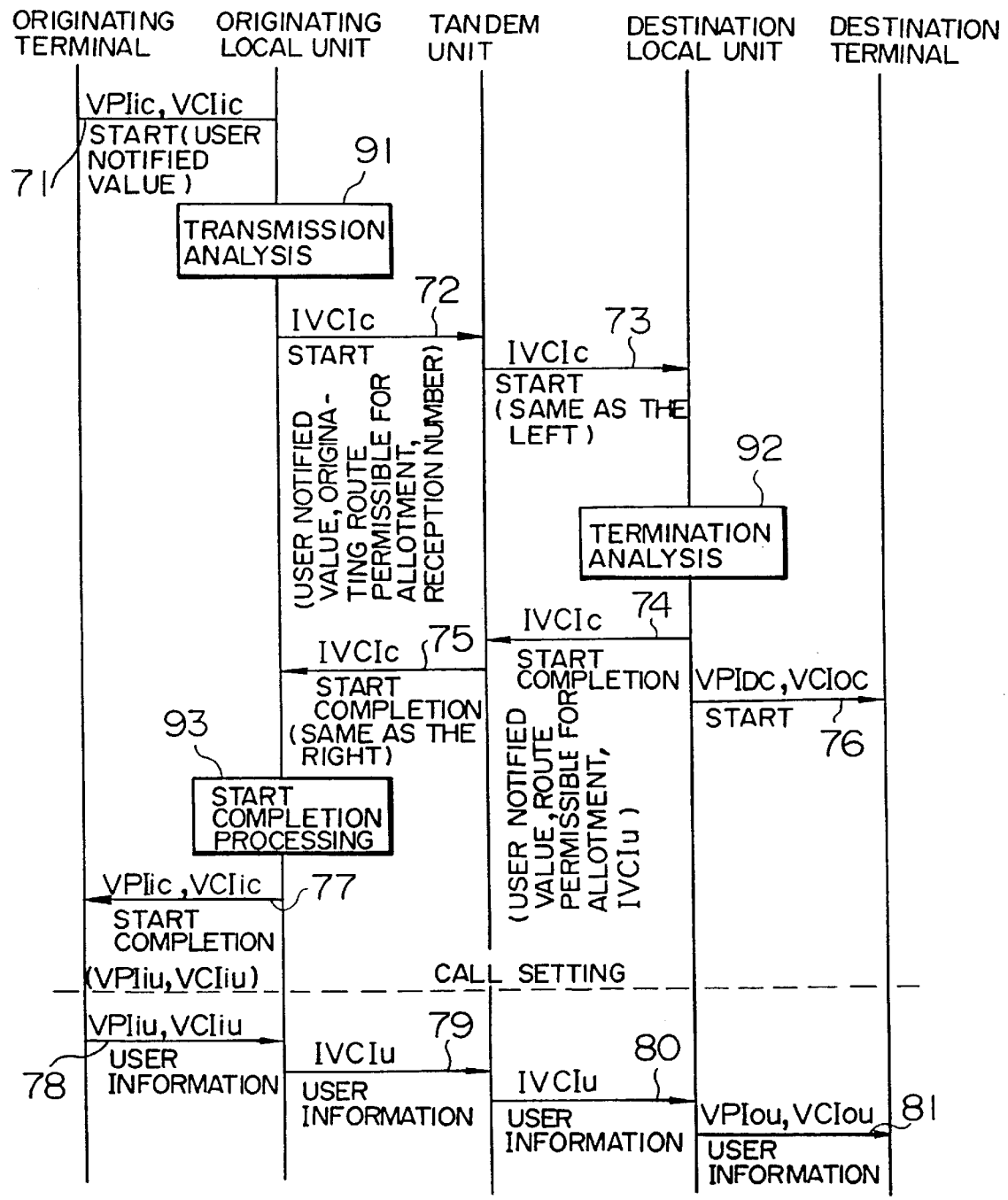
FIG. 8 is a signal sequence diagram.

Like the call to be terminated at this station, control is carried out in accordance with the signal sequence shown in FIG. 8.

Figure 15:
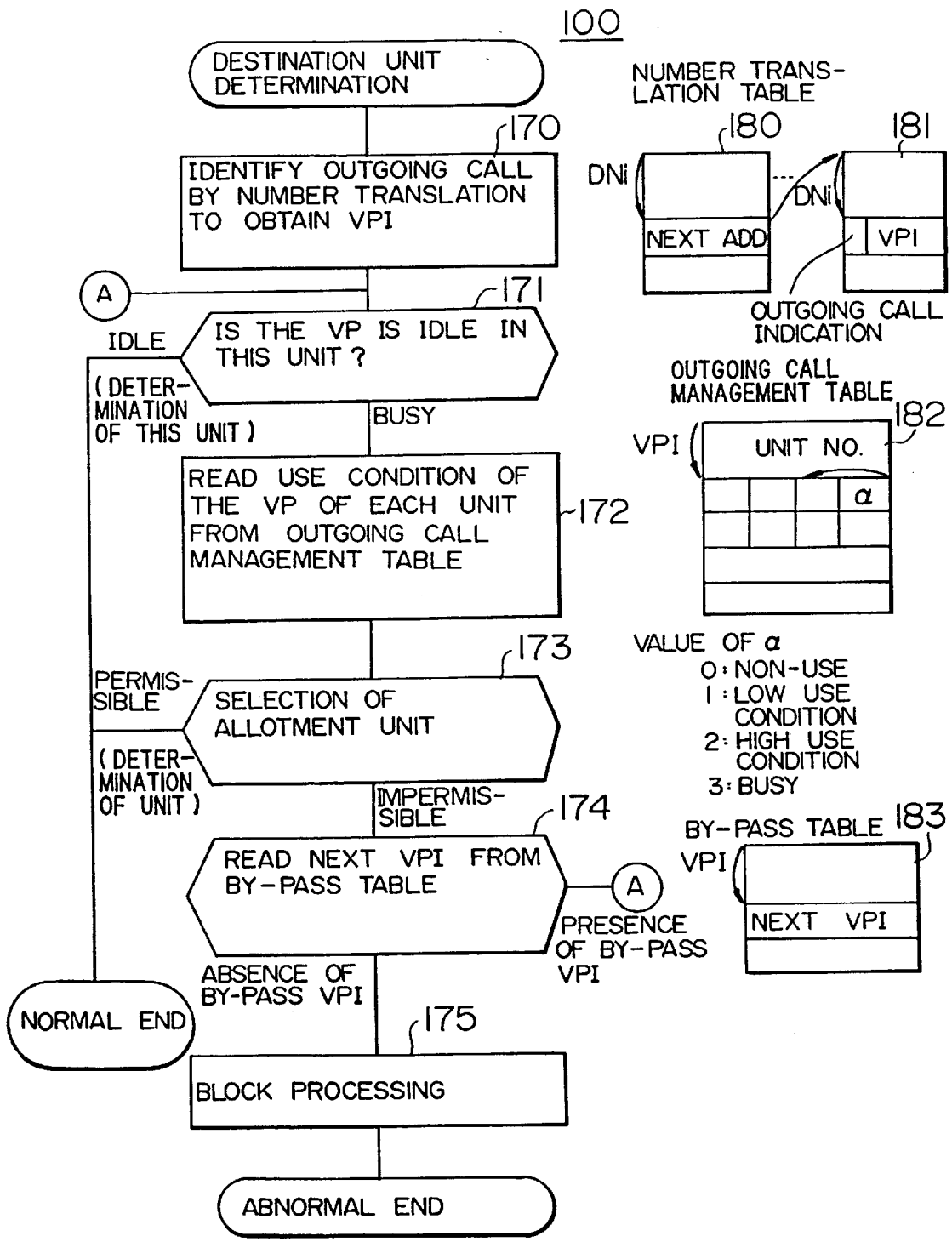
FIG. 15 is a destination unit determining processing flow chart.

In connection with outgoing calls, the destination unit determining step 100 in the transmission analysis program 91 of FIG. 9 determines a unit in which a route determined pursuant to the route selection sequence is accommodated, in accordance with a processing flow as shown in FIG. 15. Number translation tables 180 and 181 are retrieved by a received number to perform outgoing call identification so that a VPI corresponding to an outgoing route number may be read (170). It is checked whether the VPI is permissible for allotment to the VP in this local unit (171) and if permissible, a connection is done which is closed inside this local unit. If the allotment is impermissible or a circuit of interest is not connected to this local unit, a bandwidth use condition corresponding to the VPI is read out of an outgoing call management table 182 (172). For example, the bandwidth use condition is expressed by two bits in respect of each unit, with value "0" indicating non-use, value "1" indicating a low use condition (lower than a threshold), value "2" indicating a high use condition (higher than the threshold) and value "3" indicating busy (also indicative of non-packaging). In accordance with the bandwidth use condition, a unit permissible for allotment is selected (173). If all the units are impermissible for allotment, a by-pass table 183 is used and a by-pass route (next VPI) is read therefrom (174) and then processings (steps 171 to 175) like those in the aforementioned first route are carried out. If no by-pass route is available in the by-pass route table 183, a blocking processing is effected (175). When a destination local unit is determined, selection step 105 of route between the originating and destination local units, as shown in FIG. 9, is carried out as in the case of the call to be terminated at this station. The originating-side-route idle/busy table of FIG. 10 which indicates the idle/busy state by one bit in respect of each route (in this example, 0/1 corresponds to busy/idle) is read to detect an idle route (101). Subsequently, a use bandwidth corresponding to the idle route is read out of the originating-side-route use bandwidth management table shown in FIG. 11 and added with a user notified bandwidth contained in the originating call signal (102). Thus, idle indication is changed to busy indication in respect of a route in which the addition result exceeds an allotment limit value (103), and a start signal having as parameters a bit pattern indicative of route idle/busy and the user notified value is transmitted to the tandem unit (104).

<Termination Processing>

Figure 16:
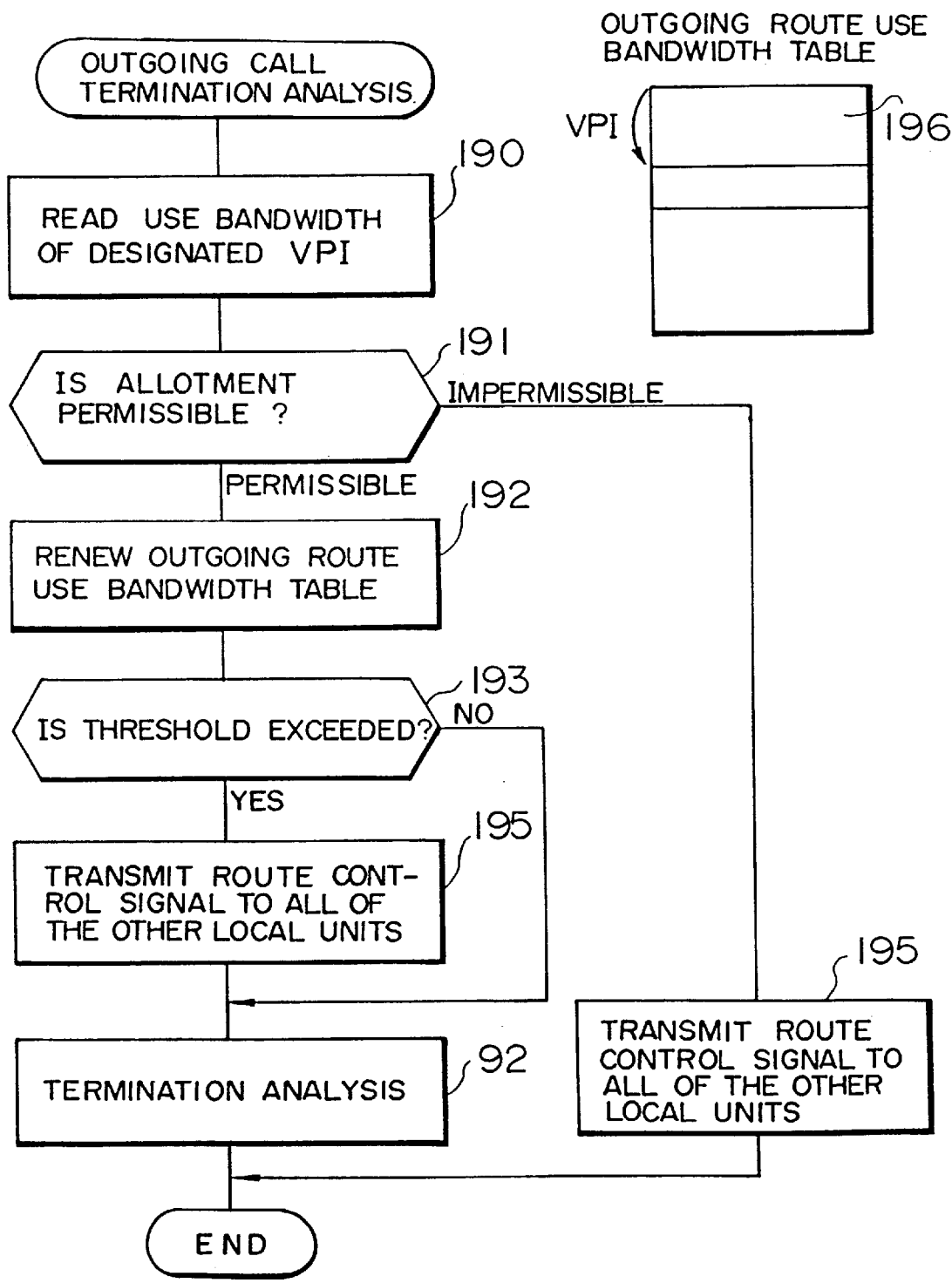
FIG. 16 is an outgoing call termination analysis processing flow chart.

When the start signal arrives at the destination local unit, an outgoing call termination analysis program 92 as shown in FIG. 16 is started. A presently used bandwidth of the designated VPI contained in the parameter of the start signal is read out of an outgoing route use bandwidth table 196 (190) and it is checked whether allotment is permissible (191). If the allotment is impermissible, a start incompletion signal is returned to the originating local unit (194) but if permissible, the outgoing route use bandwidth table 196 is renewed. If as the result of the allotment the threshold in the outgoing call management table 182, predetermined upon call setting, is exceeded, an out-going route control signal having as parameter the changed value is transmitted to all of the other units (195). Thereafter, the processing like the termination analysis 92 of the call to be terminated at this station is effected. A route permissible for allotment between the destination-side local unit 1-k and the tandem unit is selected (120). In this processing, as in the case of the originating-side route selection, the destination-side-route idle/busy table (corresponding to FIG. 10) which indicates the idle/busy state by one bit in respect of each route is read to detect an idle route. Subsequently, a use bandwidth corresponding to the idle route is read out of the destination-side-route use bandwidth management table corresponding to FIG. 11 and added with a user notified bandwidth contained in the start signal. Thus, idle indication is changed to busy indication in respect of a route in which the addition result exceeds an allotment limit value and a bit pattern indicative of the idle/busy of the destination-side-route is determined. The destination-side idle/busy bit pattern and the originating-side idle/busy bit pattern in parameters of the start signal are ANDed to select an idle route (121). Then, a use bandwidth of the selected route in the destination-route bandwidth management table is renewed in accordance with the user notified value (122). When the renewed result reaches an allotment limit value, the destination-side-route idle/busy table is also renewed from idle to busy. After a user information IVCIu on the selected route is hunted (123), a circuit PT connected to the destination terminal 62 is determined in accordance with a reception number in the received packet (124) and VPIou and VCIou on the circuit connected to the destination terminal are hunted (125). The VPIou, VCIou and PT are set in an area (user information area)

corresponding to IVCIu of a label conversion table in a line interface of the destination local unit through the processor bus 29 coupled to the central controller (126). Thereafter a start completion signal having as parameters the user modified value, route permissible for allotment (the route determined in step 121) and hunted IVCIu is transmitted to the originating local unit (127). Subsequently, a call is set as in the case of the call to be terminated at this station and the user information is transferred.

<Release Processing>

Figure 17:
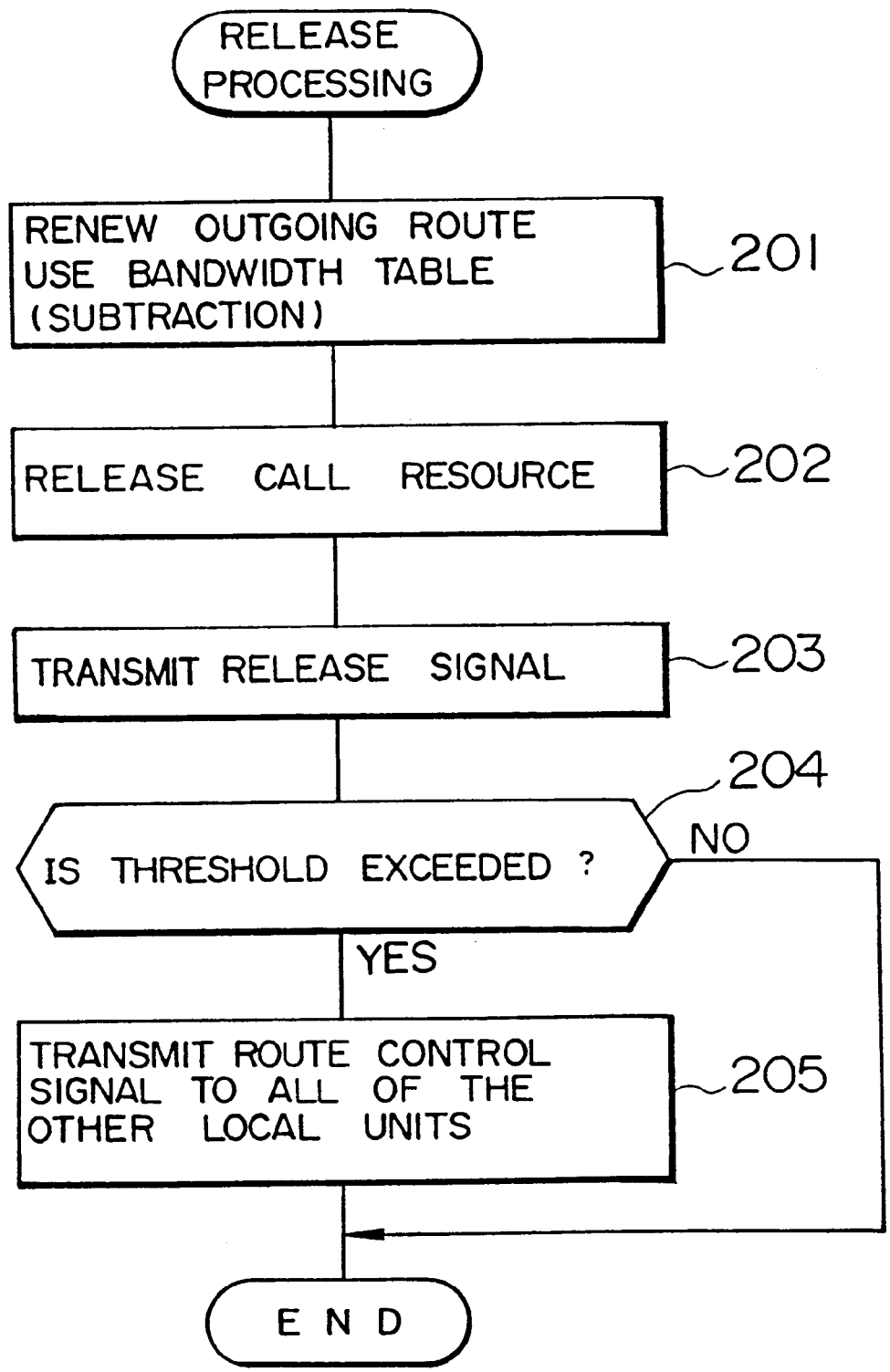
FIG. 17 is a release processing flow chart.

Upon release of a call, a release processing program as shown in FIG. 17 in the central controller of the destination local unit is started in response to a disconnection signal from the partner station. The outgoing route use bandwidth table 196 is renewed (subtraction) (201), each call resource is released (202) and a release signal is transmitted to the originating local unit (203). Following the call release processing, it is checked in the outgoing call management table 182 whether a predetermined threshold for release is exceeded (204) and if exceeded, an outgoing route control signal having a changed value as parameter is transmitted to all of the other units (205).

<Notification Processing>

Exemplarily, in the foregoing embodiment, the use bandwidth is checked for its change in respect of each call and when a predetermined threshold is exceeded, an outgoing route control signal is transmitted but there is available a system wherein checking is not done in respect of each call but each local unit periodically informs all of the other units of the use condition. In such a system as above, an outgoing route information transfer program is provided in the central controller of the local unit and started periodically, whereby the use condition of each VPI in this local unit is checked and an outgoing route control signal having as parameter, for example, a 2-bit value to be set in the outgoing call management table 182 is transmitted.

2.3 Call Operation in Integrated Node Architecture

Call operation in an integrated node system as shown in FIG. 18 will now be described. An ATM network 251 has such a construction that the physical link, virtual path VP and virtual connection VC between switching systems (nodes) are set up hierarchically. In the system construction shown in FIG. 18, the above hierarchical network construction is applied among the circuit 250 connected to the ATM network 251, the local switch 1 and the ATM cross-connector, self-routing switch 255. Similarly, the aforementioned hierarchical network construction is also set up among circuits, generally designated by reference numeral 9, between the local unit and the tandem unit. Accordingly, the originating local unit assigns a VPI between the originating local unit and tandem unit to a packet delivered to the tandem unit 2 and in the tandem unit 2, the VPI (VPIi) is converted, in the label conversion table 256 preceding the self-routing switch (4; 255), into a VPI (VPIo) between the destination unit and tandem unit and an output port number PT of the self-routing switch (4; 255).

The call passing through the tandem unit 2 is sorted into three kinds consisting of a call between local units which runs through the self-routing switches 4-$l$ to 4-$p$ as described in the foregoing paragraphs 2.1 and 2.2, an outgoing (incoming) call which uses for cross-connection the self-routing switch 255, and a trunk call which causes a call from the trunk network 251 not to be terminated at this station but to be passed again through the trunk network 251.

(1) Call between Local Units

This call runs through the self-routing switches 4-$l$ to 4-$p$ for interconnection of local units in the tandem unit 2 and with this call, in the originating local unit, the output port number RT of the self-routing switches 4-$l$ to 4-$p$ in the tandem unit 2 is not designated but a VPIi between the originating local unit and tandem unit is designated (inserted into a packet), whereby in the label conversion table 256 of the tandem unit 2, the VPIi is converted into a VPIo between the destination local unit and tandem unit and an output port number RT of the self-routing switches 4-$l$ to 4-$p$, thus effecting the call operation described in the foregoing paragraphs 2.1 and 2.2.

(2) Outgoing (Incoming) Call

This call runs between this node and the trunk network 251 through the self-routing switch 255 for cross-connection in the tandem unit 2 and consists of an outgoing call which leaves this node for the ATM trunk network 251, and an incoming call which is destined from the ATM trunk network 251 for this node. Here, the outgoing call will be described.

Through the call setting operation described in paragraph 2.2, user information is transferred in sequence of the originating local unit (for example, 1-$l$), self-routing switch inside the tandem unit (for example, 4-$l$) and destination local unit (for example, 1-$k$) and it is transmitted, in the form of a packet format shown in FIG. 6C, to a packet circuit 9' $a$-$s$ connected to the self-routing switch 255 for cross-connection inside the tandem switch 2. In the label conversion table 256 connected to the packet circuit 9' $a$-$s$ in the tandem switch 2, VPIo is converted into a VPI for ATM trunk network 251 and an output port number PT of the self-routing switch 255 for cross-connection, which information is inserted into the packet header. In the self-routing switch 255, the packet is switched in accordance with the PT so as to be transmitted to a packet circuit connected to the ATM trunk network 251 (for example, 250$b$-$l$).

(3) Trunk Call

This call is to cause a call from the trunk network 251 not to arrive at the packet switching system but to pass again through the trunk network 251 by using the self-routing switch 255 for cross-connection inside the tandem switch 2 and with this call, this node is used as only an ATM cross-connector. A packet from the ATM trunk network 251, in the form of a packet format shown in FIG. 6C, arrives at the tandem switch 2 through a packet circuit 250$a$-$u$, for example. Then, as in the case of the outgoing call, the packet is transferred to a packet circuit (for example, 250$b$-$l$) connected to the ATM trunk network 251.

The signal processor 252 and central controller 253 are not used upon transfer of information but are used upon setting of label conversion table. When building station or extending station, the local unit 1 transmits as a table rewrite request signal a control packet using a special VPI to the tandem unit 2 and the label conversion table 256 in the tandem unit delivers an output port number PT of a circuit connected to the signal processor 252 so that the control packet may terminate at the signal processor 252. The signal processor assembles a packet and informs the central controller 253 of the assembly of the packet. In accordance with a parameter of the signal, the central controller 253 sets the label conversion table 256.

A packet switching system comprised of only local units according to another embodiment of the invention will now be described with reference to the accompanying drawing.

Figure 20:
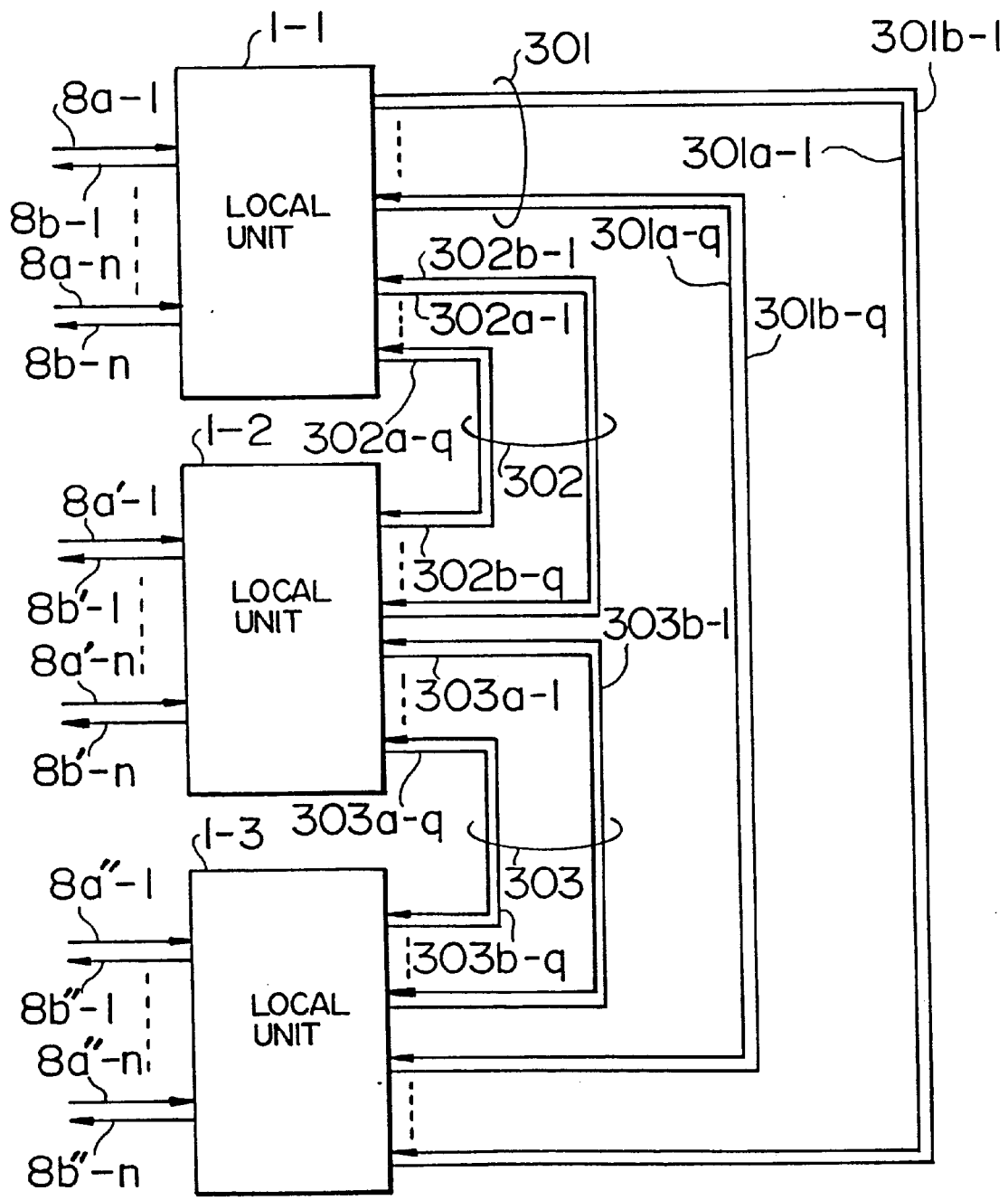

1. Explanation of Construction 1.1 Packet Switching System Comprised of Only Local Units FIG. 20 shows an example of construction of a packet switching system comprising a plurality of local units.

Circuits between the local units do not run through a tandem unit but direct interconnection in a mesh pattern is established between local units. In the constructional example of FIG. 20, an inter-local unit circuit group 301 connects a local unit 1-*l* and a local unit 1-3, an inter-local unit circuit group 302 connects the local unit 1-*l* and a local unit 1-2, and an inter-local unit circuit group 303 connects the local unit 1-2 and a local unit 1-3.

2. Explanation of Operation 2.1 Call Operation of System Comprised of Only Local Units Call operation in the packet switching system (FIG. 20) comprising a plurality of local units will now be described. Since the inter-local unit circuit does not run through a tandem unit but direct inter-local unit connection is established, negotiation between the originating and destination local units can be dispensed with when selecting a circuit between local units. This is because it will do that any one of the local units, for example, only the originating local unit may manage the inter-local unit circuit. Accordingly, the transmission analysis processing 91 of FIG. 9 can dispense with steps 103 and 104 and in a resulting processing, an inter-local unit circuit is hunted. Similarly, the termination analysis processing 92 of FIG. 12 may be removed of steps 120, 121 and 122 and the start completion processing 93 of FIG. 13 may be removed of step 140.

As is clear from the foregoing description, by adopting the complete load distributed construction wherein each local unit is allowed to have the independent switching function and control in respect of each call is not carried out in the tandem unit, the following effects can be obtained.

(1) Even in the event that a fault occurs in the tandem unit or a circuit between the local unit and the tandem unit, stand-alone operation can be permitted for a call which returns inside the local unit.

(2) By making communications between the local unit and tandem unit an inter-station interface, the use of standard units and standard programs can be permitted.

(3) The minimum construction can be of a single local unit alone, offering advantages of high economy and high extension capability for enlargement of scale.

Further, by managing a use bandwidth of a circuit between the local unit and tandem unit by means of the local unit connected with that circuit and selecting an optimum route by taking the bandwidth use condition of the destination circuit into consideration in accordance with a control signal upon call setting, the call loss rate can be decreased as compared to the system in which the route is selected by means of only the originating local unit.

Further, by hunting a VCI at a destination-side local unit to which information is transferred, unique allotment of VCI to calls incoming from a plurality of local units and being multiplexed on the same circuit can be ensured so that the call can be identified by only the VCI. Accordingly, the address amount of the label conversion conformable to only the VCI suffices and as compared to the case where the originating unit is also taken into consideration to allot the address, the memory amount can be decreased by 1/n in a system accommodating n local units.

Further, by making it possible to effect, in this complete distributed construction, the control of the outgoing call handling the common resource of the system, superiority can be ensured over the system provided with the common resource server, from the standpoint of performance such as spread of fault and call delay time.

In addition, by incorporating the ATM connector function into the tandem switch, the maintenance/working such as extension, which has hitherto been effected independently in respect of the switching system/transmission system can be realized through the same operation.

We claim:

1. A packet transferring method of a communication network including a plurality of local communication apparatuses and at least one intermediate communication apparatus, each of said local communication apparatuses having a plurality of packet lines, a memory storing new connection identifiers corresponding to a destination of a received packet, a converter converting a received connection identifier of a header of a packet to a new connection identifier stored in said memory, and a switch transferring said packet to one of said plurality of packet lines based on said new connection identifier, said method comprising the steps of:

deciding a connection for transferring a packet from an input packet line of an originating communication apparatus to an output packet line of a destination communication apparatus by communicating control signals between the originating communication apparatus and the destination communication apparatus through a predetermined connection for control signals;

storing new connection identifiers, corresponding to the decided connection to each of the memories of the originating communication apparatus, and the destination communication apparatus;

first converting the connection identifier of a header of a received packet to one of the new connection identifiers which are stored at the storing step and transferring the received packet in accordance with the new connection identifier to the decided connection at the originating communication apparatus;

transferring the received packet to the destination communication apparatus through an intermediate communication apparatus located between the originating communication apparatus and the destination communication apparatus in accordance with the new communication identifier; and second converting the connection identifier of the header of the packet received from the intermediate communication apparatus to another one of the new connection identifiers stored at the storing step and transferring the packet to an output packet line in accordance with the another new connection identifier to the destination communication apparatus.

2. A packet transferring method of a communication network including a plurality of local communication apparatuses, each of said communication apparatuses having a plurality of packet lines, a memory storing new connection identifiers corresponding to a destination of a received packet, a converter converting a received connection identifier of a header of a packet to a new connection identifier stored in said memory, and a switch transferring said packet to one of said plurality of packet lines based on said new connection identifier, said method comprising the steps of:

deciding a connection for transferring a packet from an input packet line of an originating communication apparatus to an output packet line of a destination communication apparatus by communicating control signals between the originating communication apparatus and the destination communication apparatus through a predetermined connection for control signals;

storing new connection identifiers, corresponding to the decided connection to each of the memories of the originating communication apparatus and the destination communication apparatus based on the decision;

first converting the connection identifier of a header of a received packet to one of the new connection identifiers stored at the storing step and transferring the received packet in accordance with the new connection identifier to the decided connection at the originating communication apparatus; and second converting the new connection identifier of header of the packet received from the originating communication apparatus to another one of the new connection identifiers stored at the storing step and transferring the packet to an output packet line in accordance with the another new connection identifier to the destination communication apparatus.

* * * * *

UNITED STATES PATENT AND TRADEMARK OFFICE
CERTIFICATE OF CORRECTION

PATENT NO. :     5,999,537
DATED      :     December 7, 1999
INVENTOR(S):     S. TANABE, et al It is certified that error appears in the above-identified patent and that said Letters Patent is hereby corrected as shown below:

Claim 1, col. 14, line 38, delete "com-";
col. 14, line 39, delete "munication" and insert --connection--.

Signed and Sealed this

Seventh Day of November, 2000

Attest:

Q. TODD DICKINSON

Attesting Officer          Director of Patents and Trademarks